United States Patent
McNeilus et al.

(10) Patent No.: US 10,703,569 B2
(45) Date of Patent: Jul. 7, 2020

(54) POWER FOLD AND SWING CHUTE ASSEMBLY

(71) Applicant: Con-Tech Manufacturing, Inc., Dodge Center, MN (US)

(72) Inventors: Garwin McNeilus, Dodge Center, MN (US); Grant McNeilus, Dodge Center, MN (US); Brian Meldahl, Brownsdale, MN (US); Jay Attelson, Rochester, MN (US); James Cunningham, Rochester, MN (US)

(73) Assignee: Con-Tech Manufacturing, Inc., Dodge Center, MN (US)

( * ) Notice: Subject to any disclaimer, the term of this patent is extended or adjusted under 35 U.S.C. 154(b) by 20 days.

(21) Appl. No.: 16/234,237

(22) Filed: Dec. 27, 2018

(65) Prior Publication Data

US 2019/0352096 A1    Nov. 21, 2019

Related U.S. Application Data

(60) Provisional application No. 62/671,834, filed on May 15, 2018.

(51) Int. Cl.
   *B65G 11/12*     (2006.01)
   *B60P 3/16*      (2006.01)
(52) U.S. Cl.
   CPC .............. *B65G 11/126* (2013.01); *B60P 3/16* (2013.01)
(58) Field of Classification Search
   CPC .............................. B65G 11/12; B65G 11/126
   USPC ....... 193/4, 6, 10, 15, 16, 22, 25 A, 30, 2 A; 414/476, 523; 298/7; 366/68
   See application file for complete search history.

(56) References Cited

U.S. PATENT DOCUMENTS

| | | | | |
|---|---|---|---|---|
| 1,394,161 A | * | 10/1921 | Foote | B28C 5/2081 366/68 |
| 1,415,411 A | * | 5/1922 | Shafer, Jr. | B28C 5/2081 193/10 |
| 2,522,293 A | * | 9/1950 | Noble | B28C 5/1843 366/14 |
| 2,542,799 A | * | 2/1951 | Day | B60P 1/34 298/11 |
| 2,557,358 A | * | 6/1951 | Martinson | B28C 5/1843 366/14 |
| 2,672,966 A | * | 3/1954 | Gerst | B28C 5/4248 193/10 |

(Continued)

*Primary Examiner* — Douglas A Hess
(74) *Attorney, Agent, or Firm* — Craig J. Lervick; Larkin Hoffman Daly & Lindgren, Ltd.

(57) ABSTRACT

A delivery chute for use on a concrete mixer truck has automated systems to allow for repositioning and reconfiguration without requiring an operator to manipulate components. The chute is configured to have multiple segments that can be folded/nested with one another for transport and can be positioned in an extended configuration thereby forming a continuous delivery surface for purposes of delivering concrete to a desired location. Powered mechanisms are used to reposition these segments, thus eliminating the need for operators to handle chute segments at all. A control system is provided to coordinate operation of components so proper sequences are followed during folding, unfolding, raising, lowering and swinging operations. An operator can control each of these operations using a remote control, having single buttons to carry out specific operations.

28 Claims, 19 Drawing Sheets

(56) References Cited

U.S. PATENT DOCUMENTS

| | | | | |
|---|---|---|---|---|
| 2,688,472 A * | 9/1954 | Lendved | | B28C 5/4237 366/41 |
| 2,880,977 A * | 4/1959 | Glenway, Jr. | | B28C 5/4282 366/46 |
| 3,072,371 A * | 1/1963 | Doyle | | B64D 1/16 244/137.1 |
| 3,367,636 A * | 2/1968 | Duecy | | B28C 5/4255 366/49 |
| 3,774,741 A * | 11/1973 | Johnson | | B28C 5/4251 193/10 |
| 4,498,568 A * | 2/1985 | Christenson | | B65G 11/186 193/10 |
| 4,711,334 A * | 12/1987 | Barry | | B28C 5/4251 193/10 |
| 5,192,178 A * | 3/1993 | Silbernagel | | B28C 5/4251 193/10 |
| 5,551,776 A * | 9/1996 | Zimmerman | | B28C 5/4251 193/6 |
| 5,640,996 A * | 6/1997 | Schlecht | | B66C 13/40 137/615 |
| 5,927,461 A * | 7/1999 | Jamieson | | B28C 5/4251 193/6 |
| 6,041,907 A * | 3/2000 | Bonnette | | B28C 5/4251 193/10 |
| 6,186,304 B1 * | 2/2001 | Hakansson | | B28C 5/4251 193/25 A |
| 6,578,694 B2 * | 6/2003 | Harris | | B28C 5/4248 193/16 |
| 6,609,603 B2 * | 8/2003 | Cole | | B65G 11/146 193/10 |
| 6,719,118 B1 * | 4/2004 | Eull | | B28C 5/4251 193/10 |
| 6,918,481 B2 * | 7/2005 | Quigley | | B65G 11/026 193/2 R |
| 7,033,066 B2 * | 4/2006 | Helder | | B28C 5/4248 366/68 |
| 7,353,935 B2 * | 4/2008 | Oury | | B65G 65/28 198/550.2 |
| 8,051,970 B2 * | 11/2011 | Shaber | | B65G 11/186 193/10 |
| 8,522,948 B1 * | 9/2013 | Galvin, IV | | B65G 11/026 193/10 |
| 8,967,358 B2 * | 3/2015 | Shimizu | | B28C 5/42 193/22 |
| 9,555,968 B2 * | 1/2017 | Seaton | | B65G 11/126 |

* cited by examiner

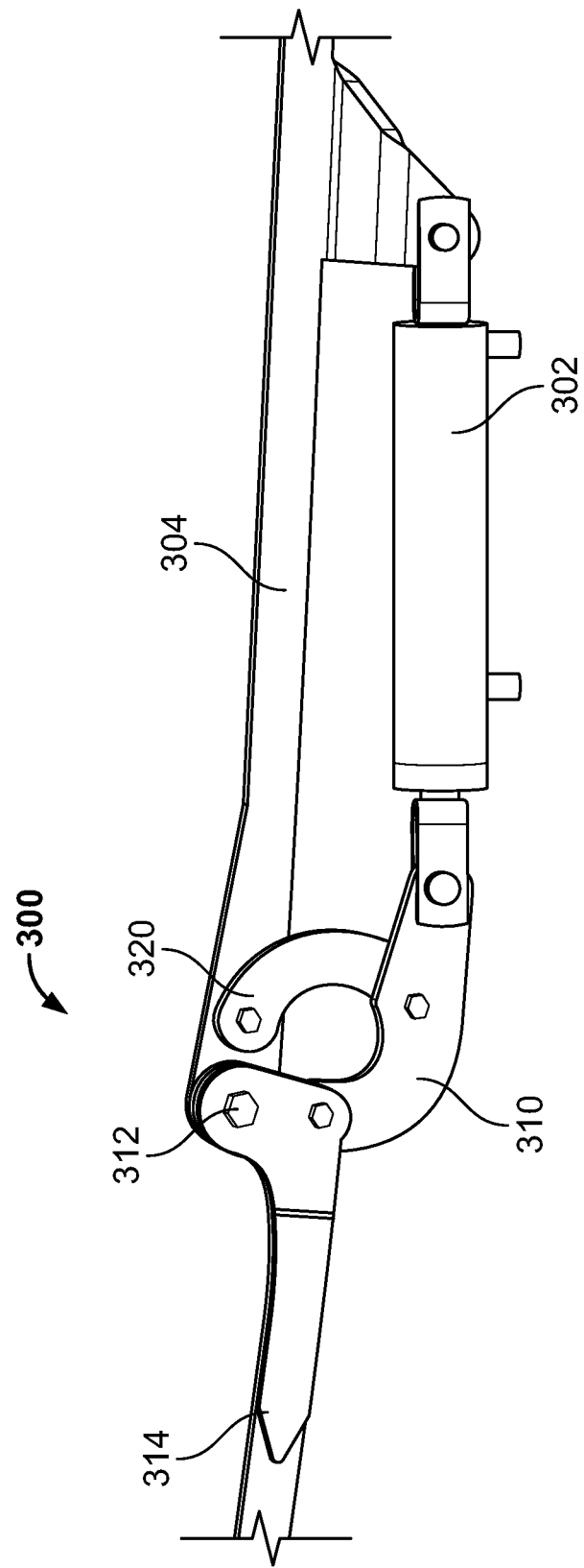

POWER FOLD AND SWING CHUTE ASSEMBLY

CROSS-REFERENCE TO RELATED APPLICATIONS

The present application claims priority to U.S. Provisional Application No. 62/671,834, filed May 15, 2018, which is incorporated herein by reference.

BACKGROUND

During the operation of concrete mixer trucks, delivery is one of the more challenging and complicated activities. In most situations, drivers are required to navigate challenging terrain in order to gain access to construction sites. Then, to most efficiently deliver concrete to the location desired by the contractors, the operator must maneuver or position the truck so the discharge chute is at a desirable location. For rear discharge cement trucks, this involves backing the truck to the desired location. Often, other construction workers are working in the area, thus the driver must continuously monitor their surroundings or have others insure the area is clear.

Once the truck is in position, a multi-piece delivery must then be deployed and positioned. In many embodiments, the delivery chute is comprised of several segments, each being removable and stored on a transport rack on the side or rear area of the truck. When necessary to extend the reach of the chute, the operator will add segments one-by-one. As is well recognized, this involves the physical manipulation of several chute segments, and requires an operator to carry/manipulate these segments by hand. As will also be appreciated, these chute segments can be heavy and cumbersome, making the deployment process somewhat challenging. Although every effort is made to make the chute segments "user friendly," this operation clearly involves the physical handling of components and creates an inherent risk of injury.

In certain instances, power mechanisms have been utilized to position the discharge chute as desired. That said, this step has historically involved the manipulation of only two segments, since only limited amounts of space exist at the rear of the truck. During transport/driving, these two segments are folded so that one segment is stacked on top of the other. Although folding chutes certainly would be convenient, the space at the back end of the truck required to hold all of these components must be kept to a minimum in order to create a safe and efficient configuration for over-the-road transport. Unfortunately, a mechanism has not yet been developed which allows the chute segments of a delivery chute to be compactly folded and retained in a folded configuration.

BRIEF DESCRIPTION OF THE DRAWINGS

Further features of the various embodiments will be apparent from the following detailed description, in conjunction with the drawings, in which:

FIGS. 7A-7C shows an alternative embodiment of a foldover linkage used to achieve the power foldover capability;

DESCRIPTION

As suggested above, powered mechanisms capable of folding, unfolding and positioning the delivery chute provide significant advantages for the more efficient operation of a concrete mixer truck. By providing automated power mechanisms and appropriate safety systems, the operations of the concrete mixer truck can largely be carried out by the driver, without the need to physically handle components or systems. In addition, the possible inclusion of various sensors, monitors, audible alarms and other safety devices could provide enhanced safety and further reduce the risk of injury. All of these components combine to create an efficient and effective system for the delivery of concrete.

Figure 1:
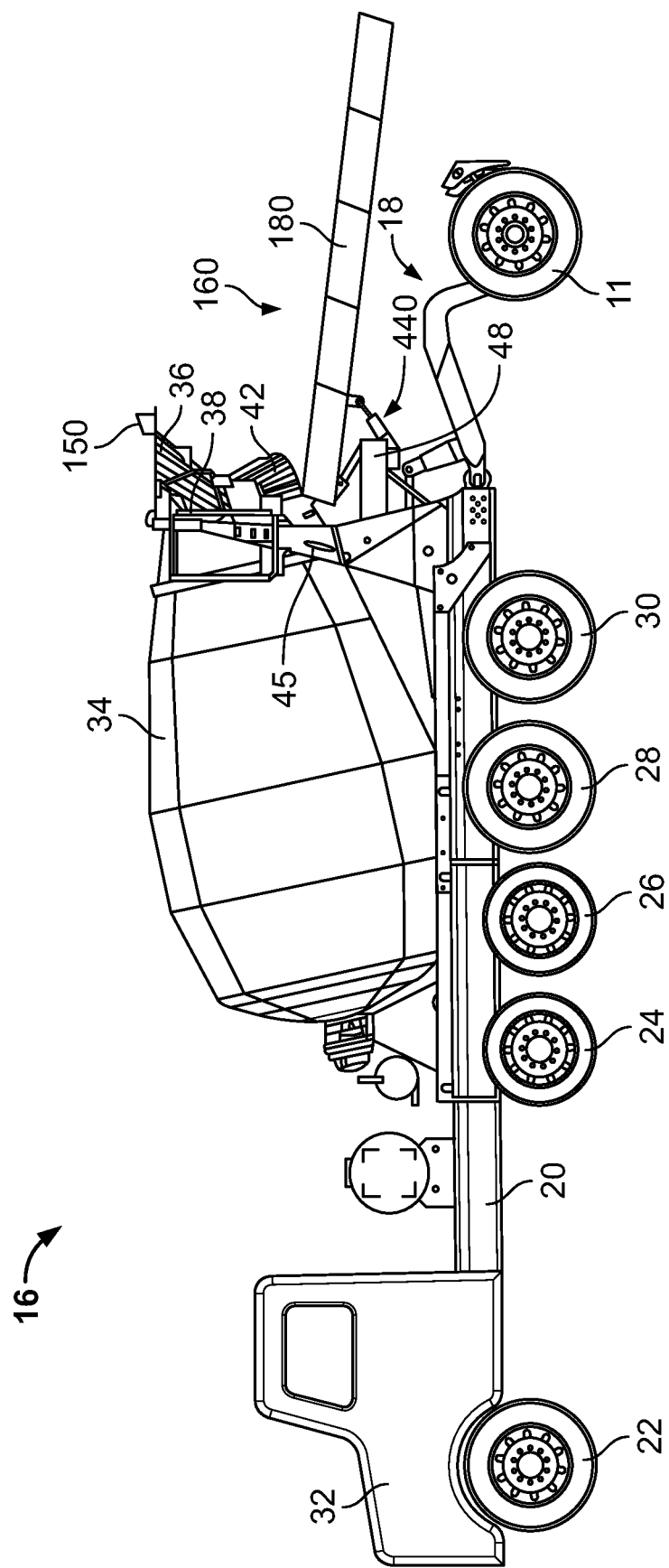
FIG. 1 as a side elevation view of a concrete mixer truck.

Turning now to the drawings, FIG. 1 illustrates an example concrete mixer truck or vehicle 16. Vehicle 16 includes a main frame or chassis 20 supported by several wheel/axle assemblies including a forward assembly 22 (i.e. front wheel) for steering, and additional load bearing assemblies 24, 26, 28, and 30 (i.e. wheels). This particular embodiment also includes an auxiliary wheel 11, which is used to distribute weight loads. Components supported by the chassis include a cab 32, a mixing drum 34 supported to rotate relative to the chassis, and a charge hopper 36 located behind an upper opening 38 of drum 34. Charge hopper 36 is specifically configured to facilitate the loading of materials into drum 34. More specifically, charge hopper 36 and the rear portion of drum 34 are supported by a rear pedestal 45, which extends upwardly from chassis 20. As also illustrated, and further discussed below, several additional components are supported by rear pedestal 45.

In this particular embodiment, an auxiliary axle system 18 is included to support auxiliary wheel 11 and to help transfer and/or balance necessary loads. As also shown, mixing truck 16 includes a collection chute or collector 42 positioned below charge hopper 36, and a repositionable power delivery system 160 mounted at the rear of the truck in a location situated below collector 42. As is recognized, these components are configured and aligned to allow the delivery of concrete in a controlled and efficient manner.

In the embodiments outlined below, the repositionable power delivery system 160 allows for the automated positioning of a power foldover discharge chute 80, 180, without the need for physical intervention or manipulation by an operator. Generally speaking, power deliver system 160 will include power foldover chute 80, 180, a control system 200, a power swing mechanism 400, and a lift system 440, which are all described in further detail below. In use, operation of repositionable power delivery system 160 will be more convenient and will avoid the need for an operator to handle heavy and often cumbersome components. More specifically, repositionable power delivery system 160 allows the operator to position the discharge chute 80, 180 (sometimes referred to as a delivery chute) in a desired orientation or position without the need to physically handle or move components. It is contemplated that the operator will simply position the truck 16 as needed, and then will manipulate the discharge chute 80, 180 using a remote control 210.

As set forth below, FIGS. 2A-2D illustrate one embodiment of a power foldover discharge chute 80, with FIGS. 6 and 6A providing more detail related to a linkage used in this embodiment. Similarly, FIGS. 3A-3E show another embodiment (generally identified as power foldover discharge chute 180), with FIGS. 7A-7C illustrating more detail regarding the linkage used therein. As will be appreciated, these embodiments further illustrate how certain variations may exist in the specific components and/or structures, while also providing the advantages of repositionable power delivery system 160, as discussed herein.

Figure 2A:
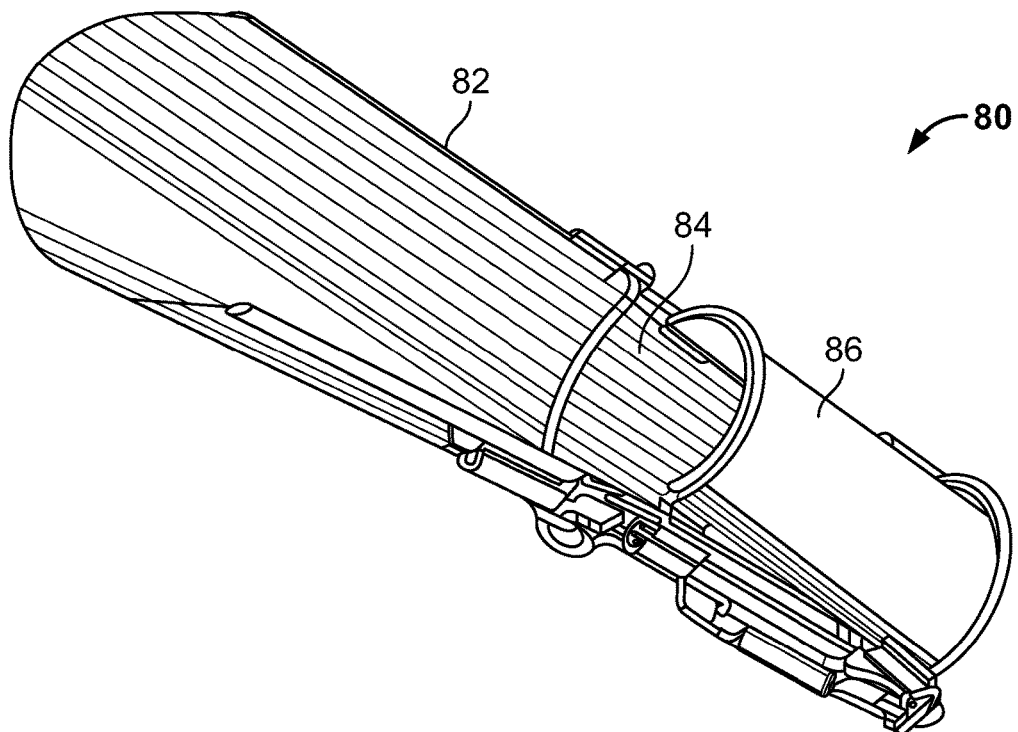
FIGS. 2A-2D are various views of an embodiment of the folding chute assembly.
Figure 2B:
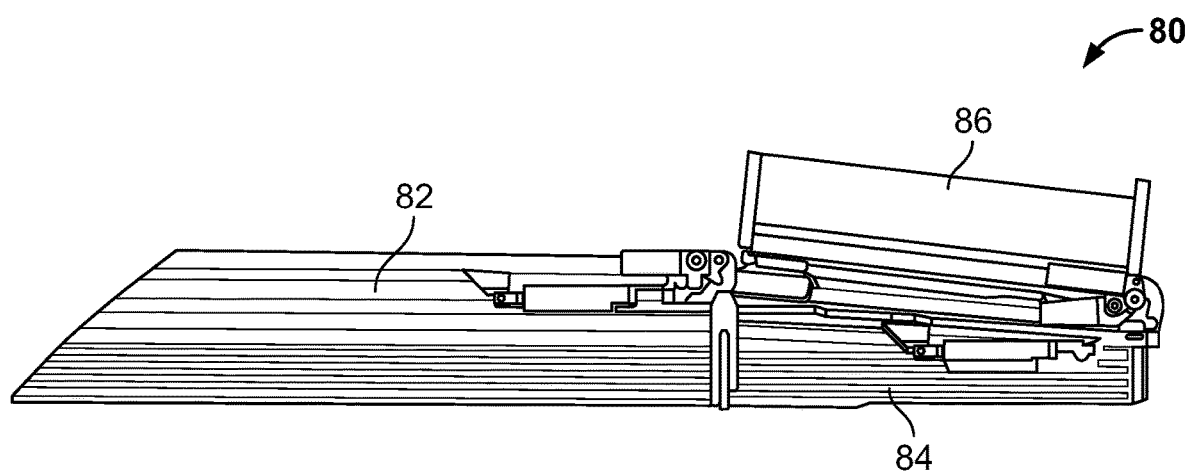
Figure 2C:
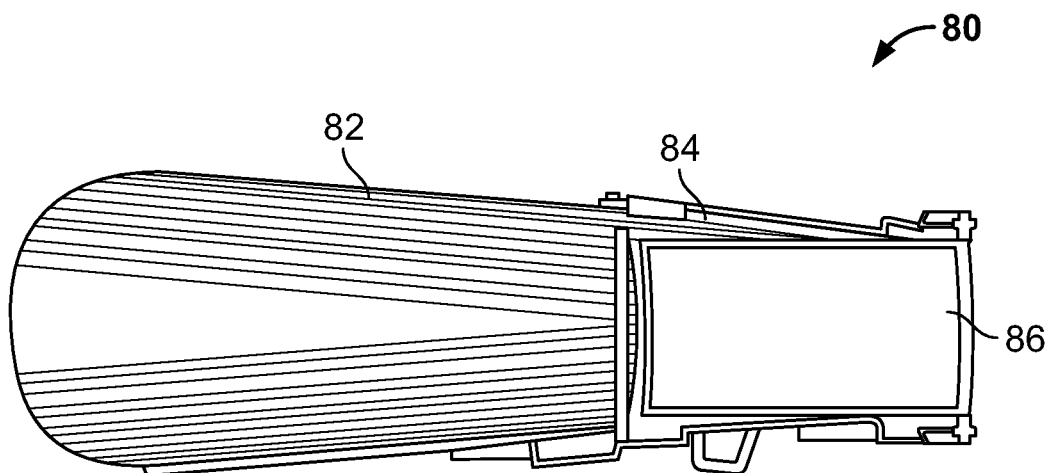
Figure 2D:
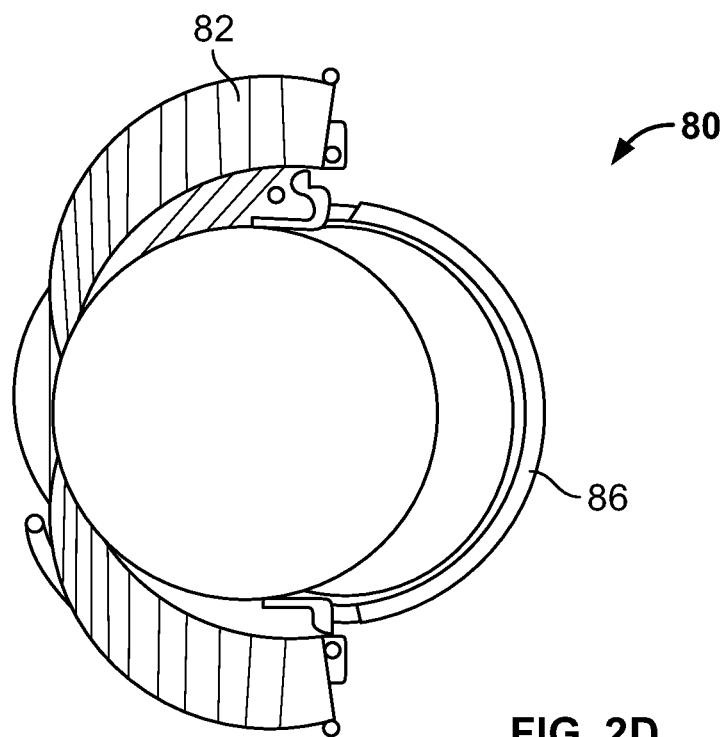

Turning now to FIGS. 2A-2D, one embodiment of a power foldover discharge chute 80 is illustrated. More specifically, FIG. 2A illustrates a perspective view of the power foldover discharge chute 80, while FIG. 2B illustrates a side view, FIG. 2C illustrates a top view, and FIG. 2D illustrates an end view. In this embodiment, power folding discharge chute 80 includes a primary segment 82, a first foldable segment 84 and a second foldable segment 86. As will be recognized, second foldable segment 86 as illustrated in FIGS. 2A-2D, is shown in a folded orientation, while first foldable segment 84 is shown in an extended orientation. It will be recognized that these components can be transitioned to further positions and orientations. More specifically, second foldable section 86 could be extended to an extended orientation wherein it is directly in line with primary segment 82 and first foldable segment 84. In this extended orientation, a substantially linear discharge chute is created, with each segment mating at an end portion thereof. Alternatively, discharge chute 80 can also be configured with all segments in the folded position. More specifically, the first segment 84 is rotated approximately 180 degrees from the position illustrated in FIGS. 2A-2D, thus causing second foldable segment 86 to be nested within primary segment 82 and causing first foldable segment 84 to be positioned above primary segment 82. In this manner, a compact folded configuration is created, thus minimizing the extension of components from the rear of the cement mixer truck.

Figure 3A:
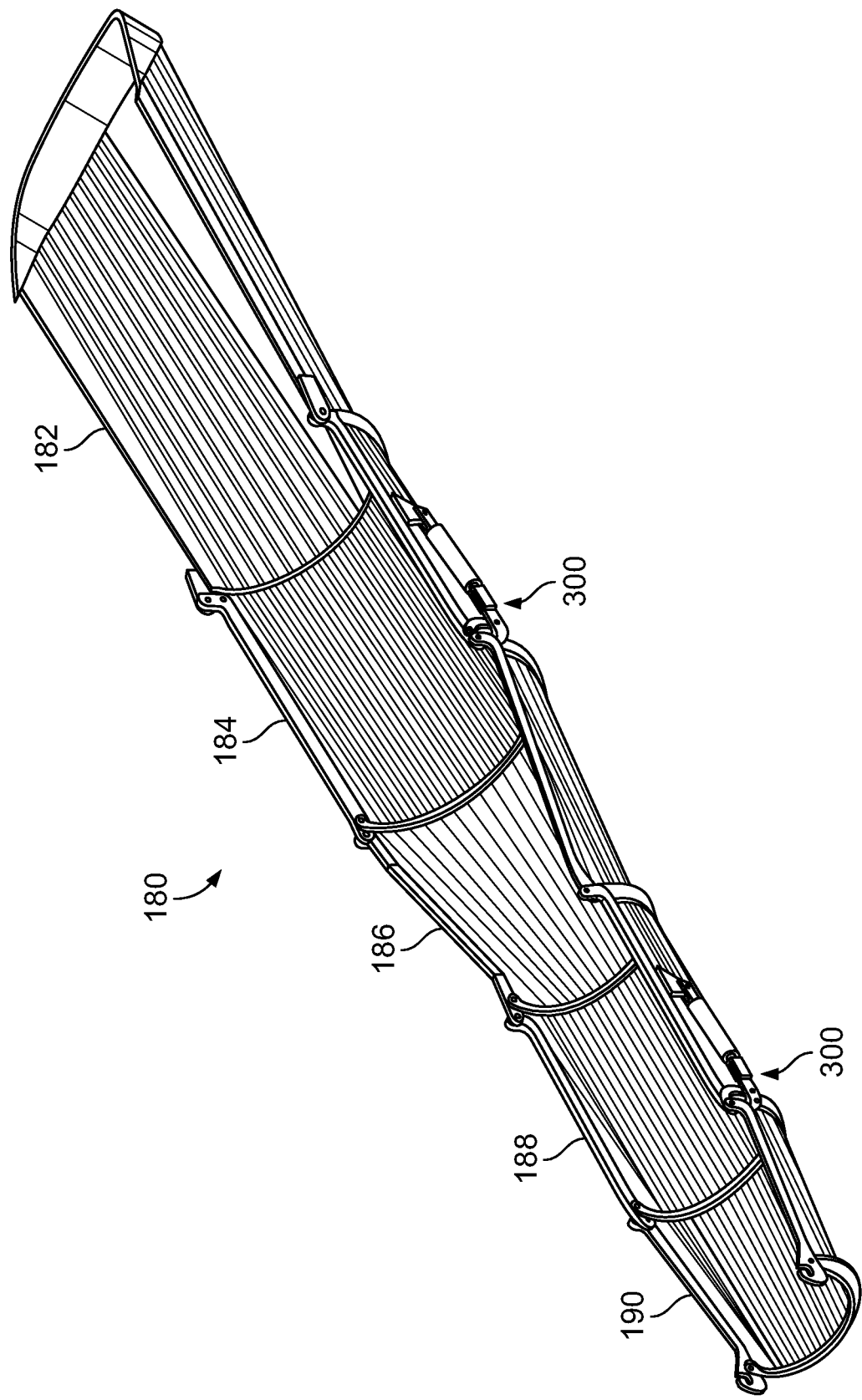
FIGS. 3A-3E illustrate another embodiment of the folding chute assembly at different stages of the folding/unfolding process.
Figure 3B:
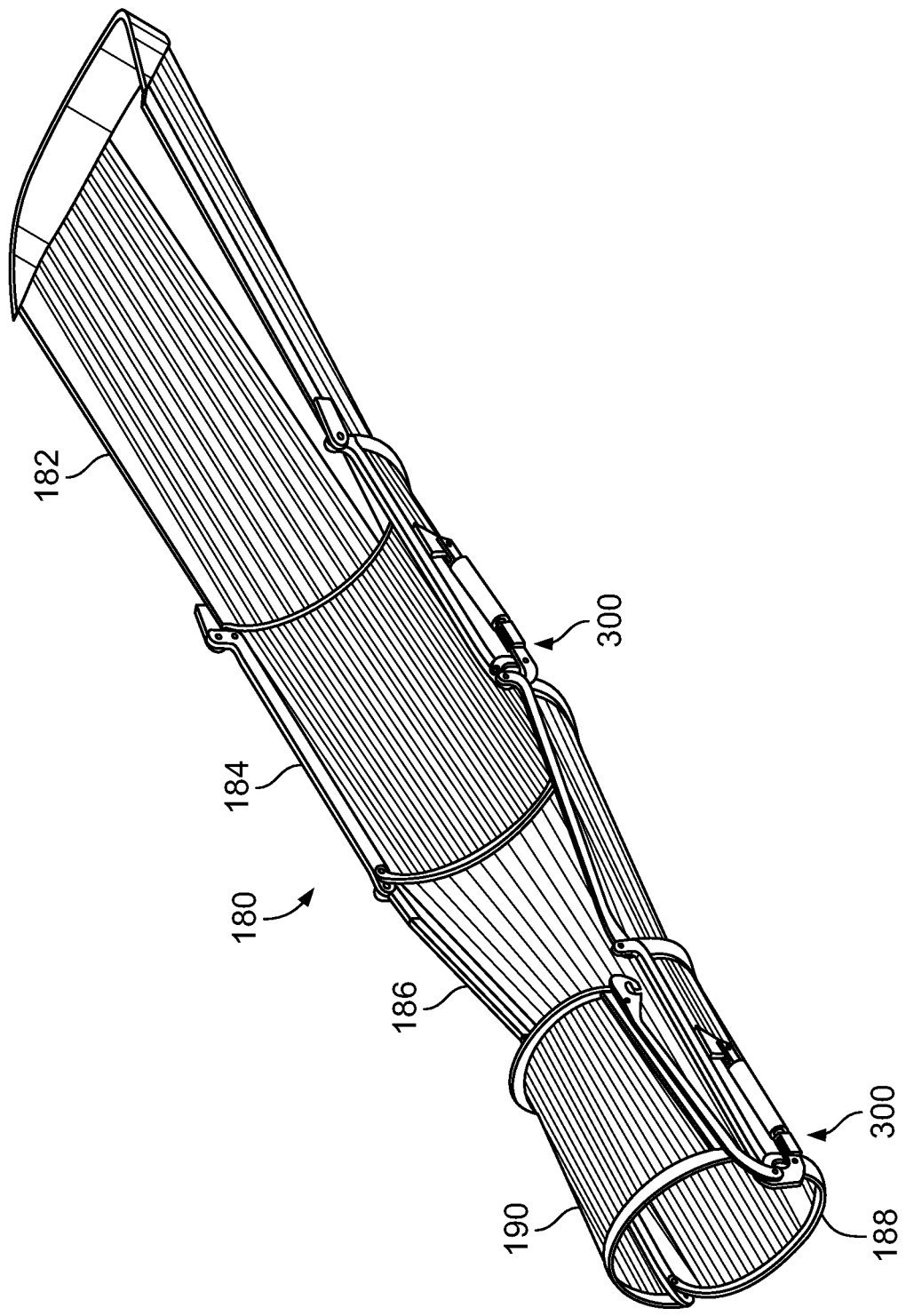
Figure 3C:
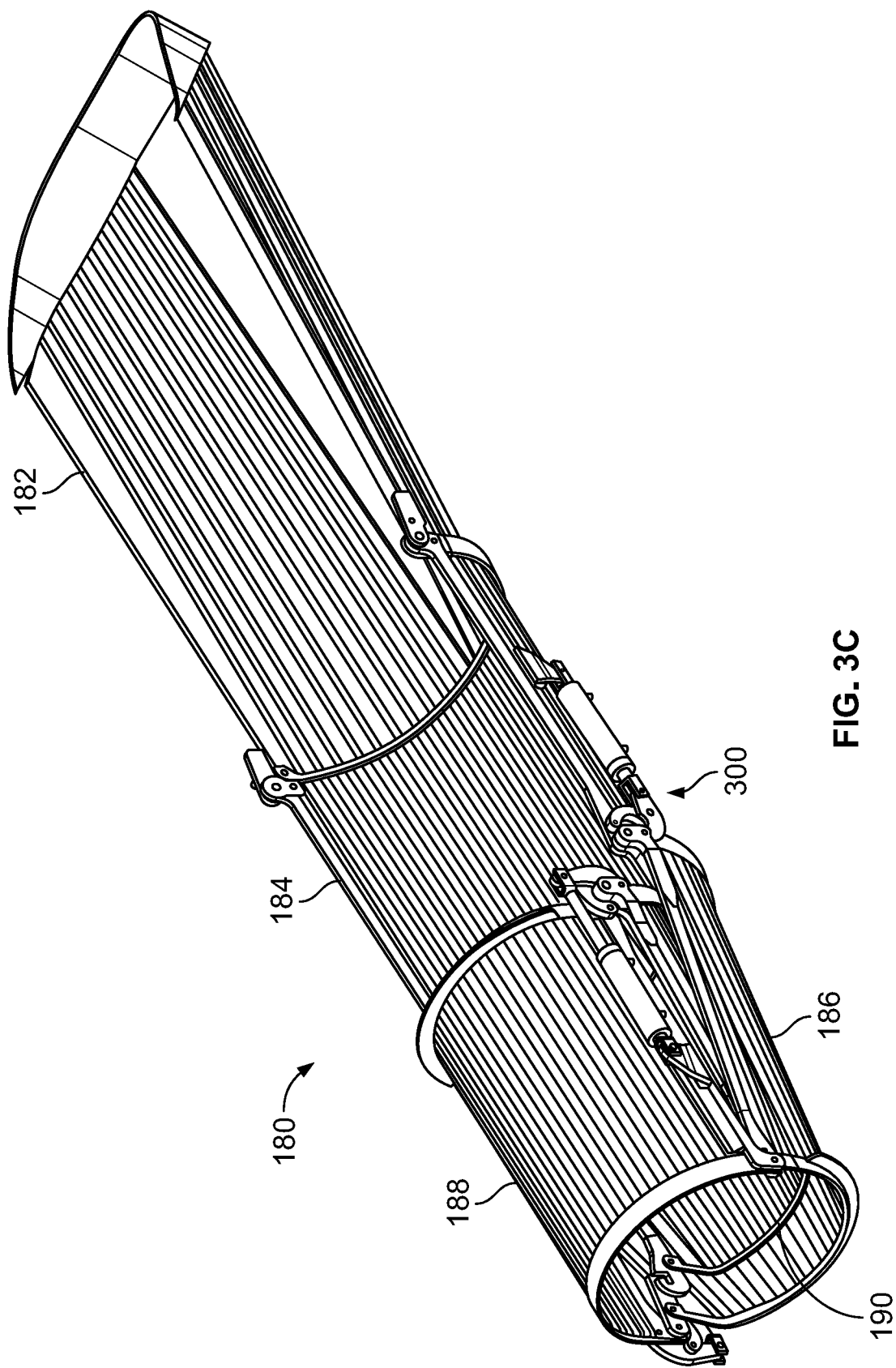
Figure 3D:
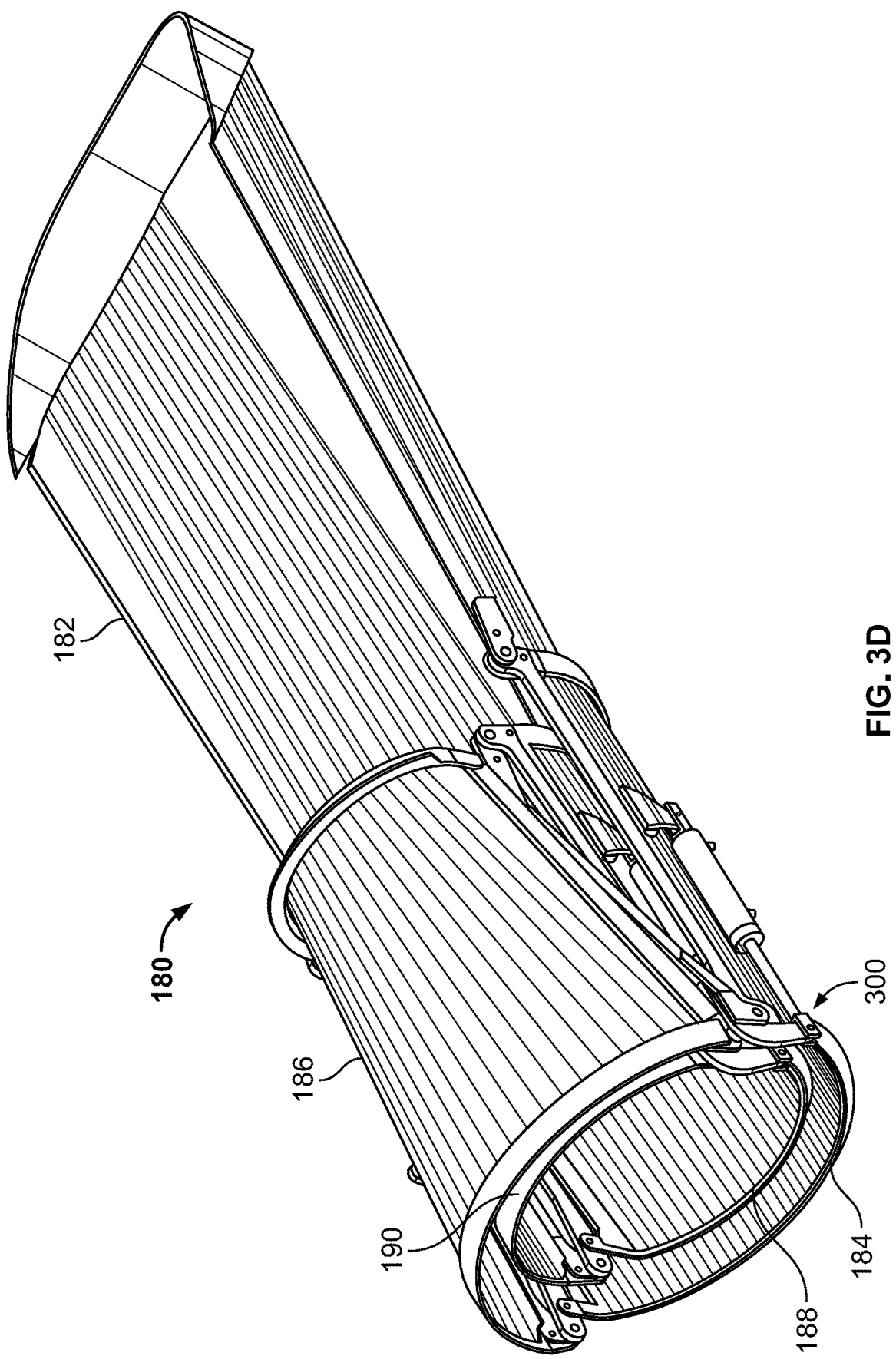
Figure 3E:
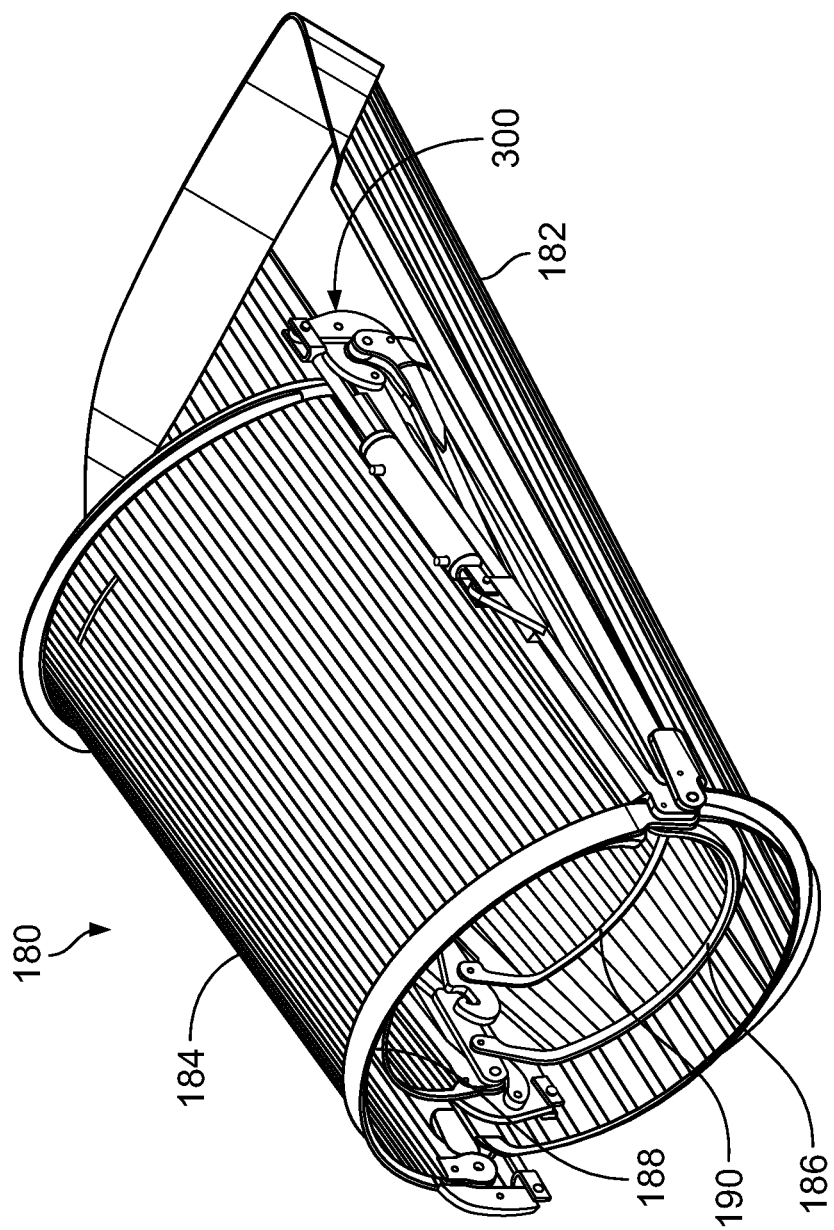

Again, FIGS. 3A-3E show an alternative embodiment of power foldover chute 180 which further utilizes the principles and features generally discussed above. As shown, power foldover discharge chute 180 includes a primary segment 182, a first foldable segment 184, a second foldable segment 186, a third foldable segment 188, and an end segment 190. Further, each of these components utilize a power hinge mechanism 300 (discussed in further detail below) to achieve the automated reconfiguration of power foldover discharge chute 180 as needed. For example, power foldover discharge chute 180 can be fully extended, with the various segments in an end-to-end orientation, as best shown in FIG. 3A (also referred to as a delivery or fully deployed configuration). Similarly, the various segments of power foldover discharge chute 180 can be folded into a collapsed configuration where the various segments are stacked or nested with one another, as best shown in FIG. 3E (also referred to as a stowed configuration or a transport configuration). In order to transition between these two configurations, a controlled process is coordinated by a controller 220 and a sequencing valve system 230, both of which are described in further detail below.

To better outline the operation of power foldover discharge chute 180, the transition from a folded or stowed position to an extended or deployed position is first explained. Assuming vehicle 16 arrives at a job site with the power foldover chute 180 in a folded or stowed configuration (e.g. the configuration shown in FIG. 3E), an unfolding process must be carried out before concrete can be delivered. To achieve this transition, first foldable segment 184 is initially unfolded until it is aligned with primary segment 182 (see e.g., FIG. 3D). Next, second foldable segment 186 is unfolded until it is aligned with first foldable segment 184 (see e.g., FIG. 3C). Once this orientation is achieved, third foldable segment 188 is unfolded so as to be aligned with second foldable segment 186 (see e.g., FIG. 3B). Lastly, final segment 190 is unfolded so that it is aligned with third foldable segment (see e.g., FIG. 3A). As will be appreciated, when in the extended or deployed configuration, power foldover discharge chute 180 forms a continuous chute (i.e. a continuous delivery surface) which can be used to deliver concrete to a desired location. Significantly, the above described transition is carried out without requiring an operator to physically handle chute segments. As further discussed below, an operator can also raise, lower or swing power foldover chute 180 as desired, using related mechanisms and systems.

Once the desired delivery of concrete is completed, it will be necessary to fold or collapse power foldover discharge chute 180 into a more compact configuration which is desirable during travel. Naturally, this folding operation is the reverse of the process outlined above. More specifically, power foldover discharge chute 180 will go through various steps, starting with the folding of end segment 190, thereby achieving the configuration generally illustrated in FIG. 3B. Next, fourth foldable segment 188 is then folded inwardly, to an orientation best illustrated in FIG. 3C. As this process continues, second foldable segment 186 is then folded upwardly/inwardly, resulting in a further folded configuration as illustrated in FIG. 3D. Lastly, to fully fold the power foldover discharge chute 180, first foldable segment 184 is then folded upwardly/inwardly, resulting in the nested and stacked configuration shown in FIG. 3E. Again, this achieves a folded configuration which is very compact and nested, so that a minimum amount of space is occupied at the rear of the vehicle, and interference with other components is avoided.

As generally illustrated, each joint or hinge has an associated hydraulic drive mechanism, which is operated to achieve the power foldover feature. This provides the significant advantage which allows recurring configuration and/or manipulation of chute segments without hands-on operator interaction. As will be further outlined below, a coordinated control system 200 is used to carry out the extension (i.e. unfolding) and folding processes so that damage and undesired actions are avoided.

To achieve the nesting capabilities generally described above, the various segments of foldover discharge chute 180 are specifically designed to cooperate with one another and to avoid interference. As generally shown in FIG. 3A, the segments making up foldable discharge chute 180 alternate between straight chutes, and tapered chutes. More specifically, primary chute 182, which is coupled to rear pedestal 45 of concrete mixer truck 16 and specifically positioned below collector 42, is slightly tapered to create a funneling effect. First foldable segment 184 and third foldable segment 188 are both partially cylindrical or straight segments, having a consistent cross sectional configuration from end to end. This could include a partially cylindrical configuration, but other geometries are possible. Alternatively, second foldable segment 186 and final segment 190 are again tapered in such a manner to have a larger radial dimension at an upper end, and a smaller radial dimension at a lower end. These segments could be partially conical, but again other geometries are equally possible.

Figure 4:
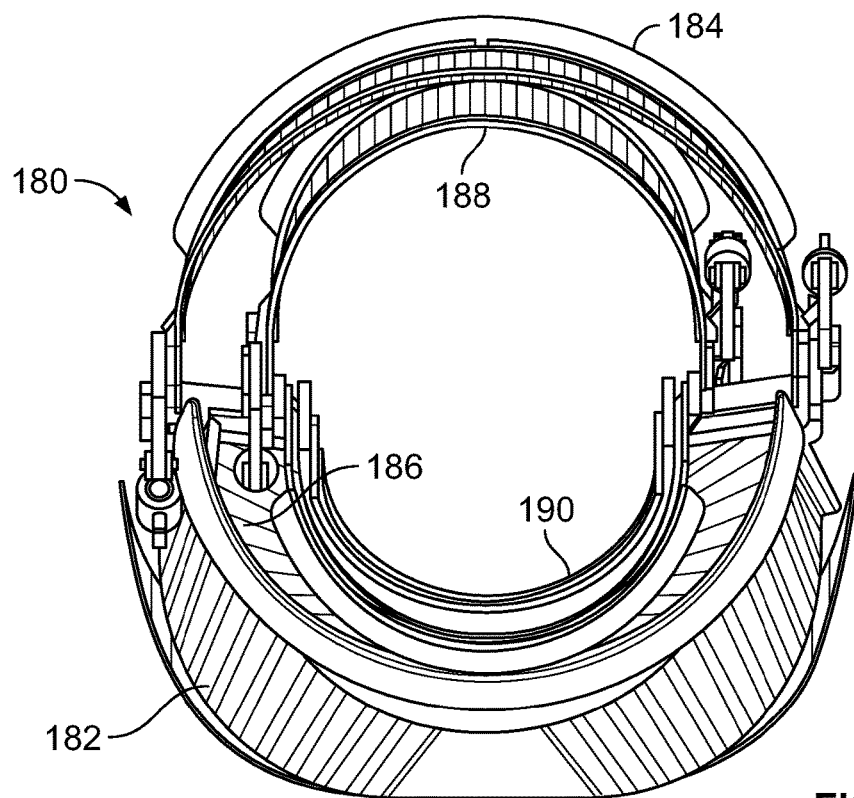
FIG. 4 is an end view of the folding chute of FIGS. 3A-3E in the fully folded configuration.

It will be further noted that first foldable segment 184 and third foldable segment 188, although both being straight chutes, also have differing dimensions (i.e. sizes) when compared with one another. These dimensions are specifically selected so that third foldable segment 188 is sized and configured to fit substantially within first foldable extension 184. Similarly, second foldable segment 186 and final segment 190 also have different dimensions and are sized so that final segment 190 may be nested within second segment 186. Further, second segment 186 is also sized and configured to be positioned and situated within primary segment 182 when power foldover discharge chute 180 is fully folded. These geometries specifically allow the various segments to be folded and nested in the manner illustrated. The relationship of components is further appreciated by examining FIG. 4, which is an end view of the foldover discharge chute 180 in its fully folded or stowed configuration.

Figure 5:
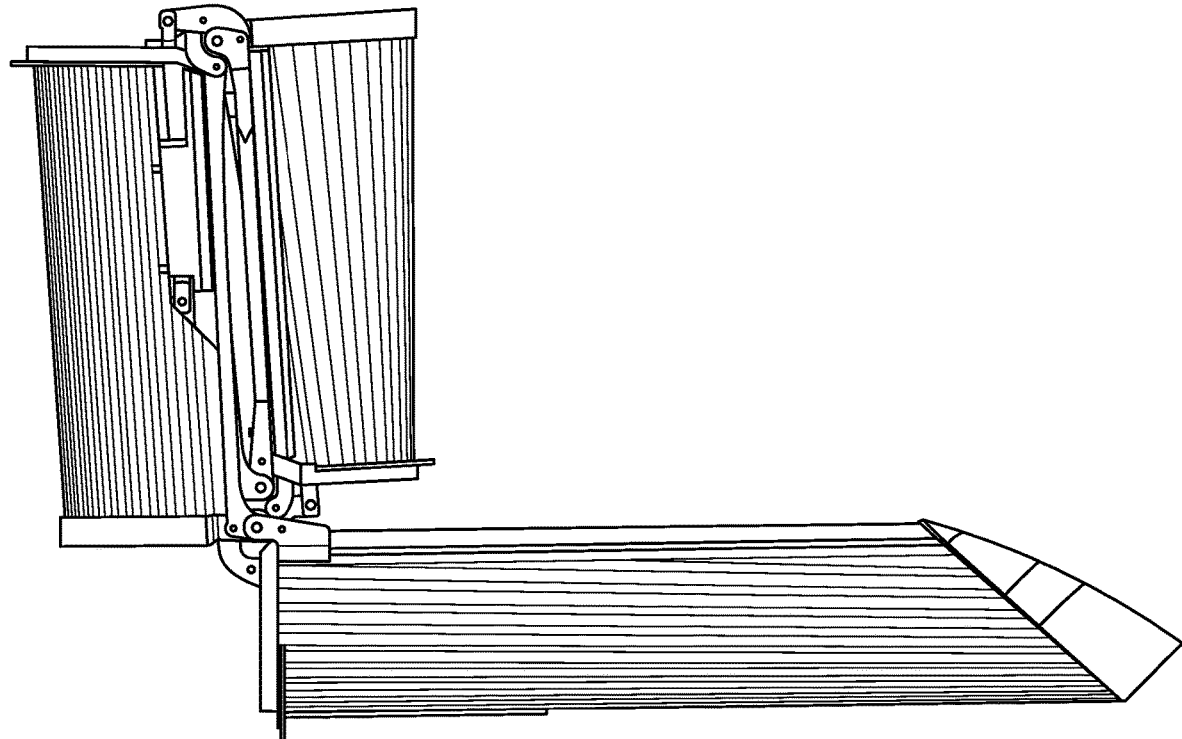
FIG. 5 is a side view of the folding chute of FIGS. 3A-3E in a partially folded configuration.

In certain circumstances, it may be necessary to operate concrete mixer truck 16 and deliver material without having power foldover discharge chute 180 completely extended. For example, there may be the need to deliver concrete to tight areas where full extension of power foldover discharge chute 180 is not required or appropriate. In these circumstances, the various foldable segments could be positioned in a non-interfering position and concrete can be delivered without using all segments. Referring to FIG. 5, this concept is better illustrated where only primary chute or primary segment 182 is utilized to deliver concrete, and the remaining segments are held away from the delivery end. More specifically, the folding segments shown in FIGS. 3A-3E above can be held in an upright position (typically oriented at a 90° angle with respect to upstream segments), thus avoiding interference which may prohibit the flow of concrete. The various components making up power foldover discharge chute 180 allow any segment to be held in a similar orientation, thus allowing concrete delivery using a subset of the segments provided.

As generally shown in FIGS. 2A-2D and FIGS. 3A-3E, power actuator mechanisms are utilized to create the folding action discussed above. In these particular embodiments, the actuators are powered by a hydraulic cylinder which generally controls a linkage mechanism. Turning now to FIG. 6, one embodiment of the linkage is more fully illustrated. As shown, hydraulic cylinder 100 is utilized to provide the desired power. Although not shown, it will be appreciated that a first lug 102 will be coupled to an upper chute segment, while a second lug 104 will be coupled to a lower chute segment. First lug 102 and second lug 104 are attached to one another at a pivot point 106 via a connection bolt. This connection provides the ability to rotate the two chute segments in conjunction with one another. As will be recognized, cooperating hinge mechanisms will be utilized on an opposite side of the chute segments. FIG. 6A illustrates one embodiment of a cooperating hinge mechanism 110. As will be appreciated, the components of cooperating hinge mechanism 110 closely mirror the various components utilized in the power linkage. Alternatively, two matching power mechanisms could be used on either side of the chute segments.

Turning again to FIG. 6, it will be appreciated that the driven end of hydraulic cylinder 100 is coupled to a middle link element 112. Middle link element 112 has a curved central portion having a first end coupled to upper lug 102 via a connection bolt. A further side of middle link 112 is connected to a pair of outer links 114 via another connection bolt. Outer links 114 are each a curved plate-like mechanism, both having an opposite end connected to lug 104. As will be appreciated by those skilled in the art, this mechanism causes rotation of lower lug 104 with respect to upper lug 102 when the hydraulic cylinder is actuated.

Figure 6:
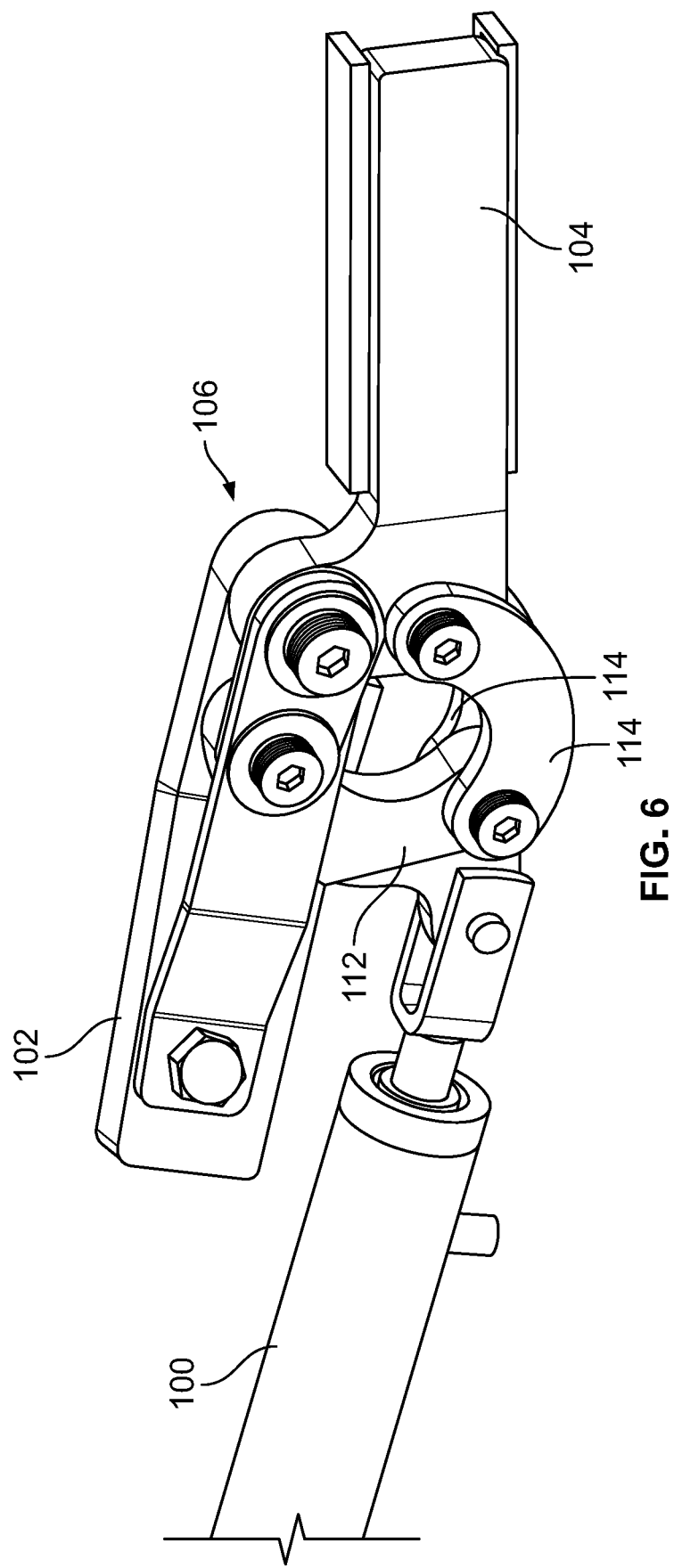
FIG. 6 is a side view of the one exemplary foldover linkage used to achieve the power foldover capability.
Figure 6A:
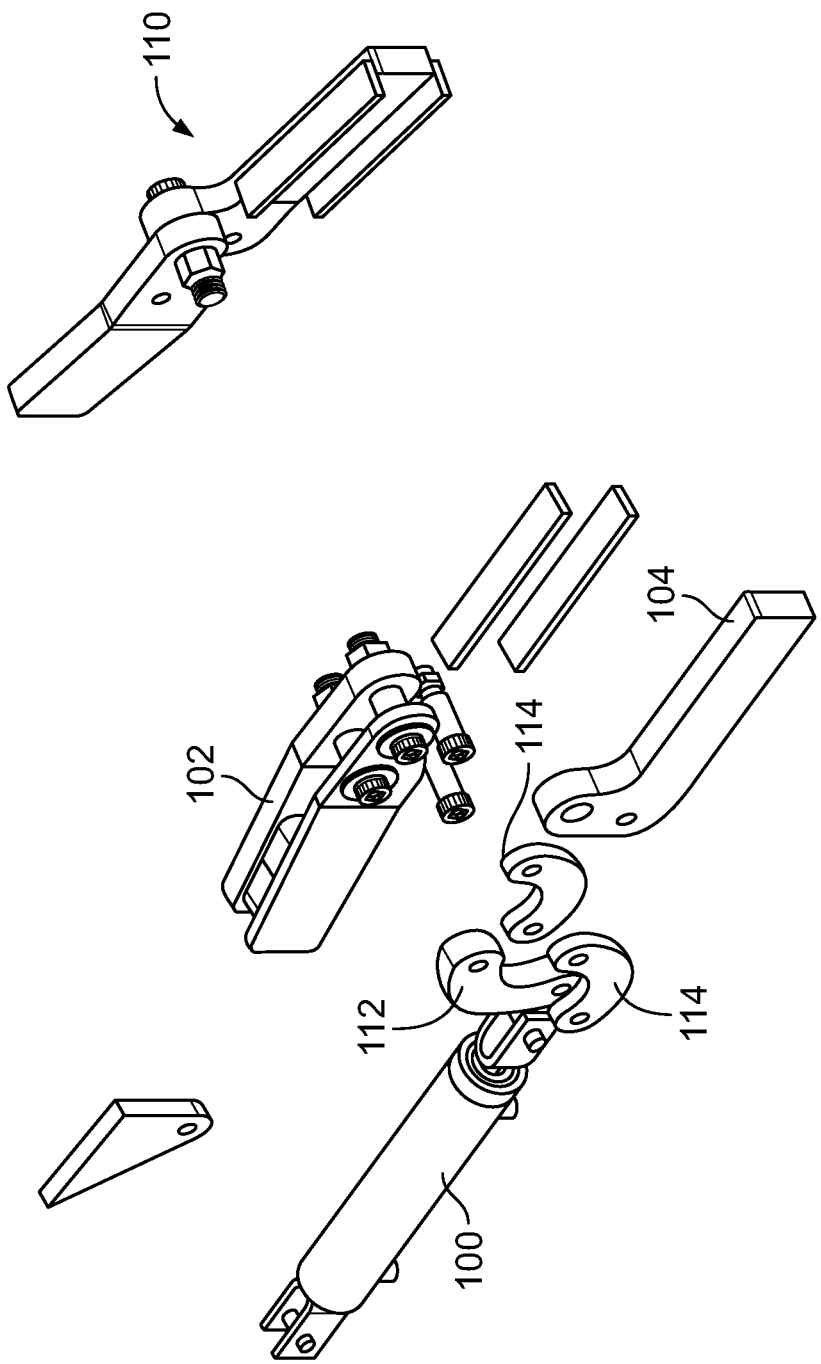
FIG. 6A is an exploded view of the power foldover linkage shown in FIG. 6.
Figure 7A:
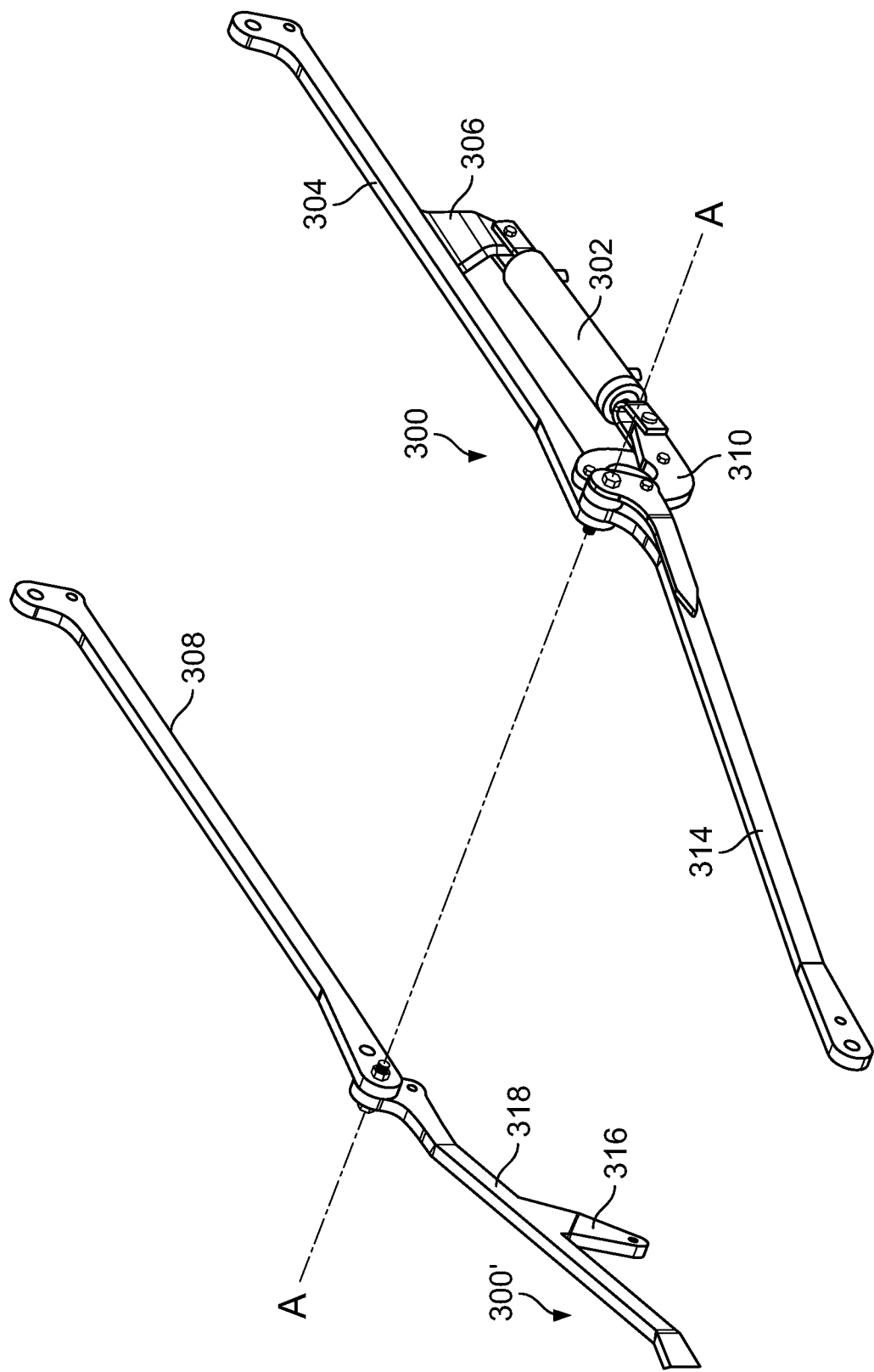
Figure 7B:
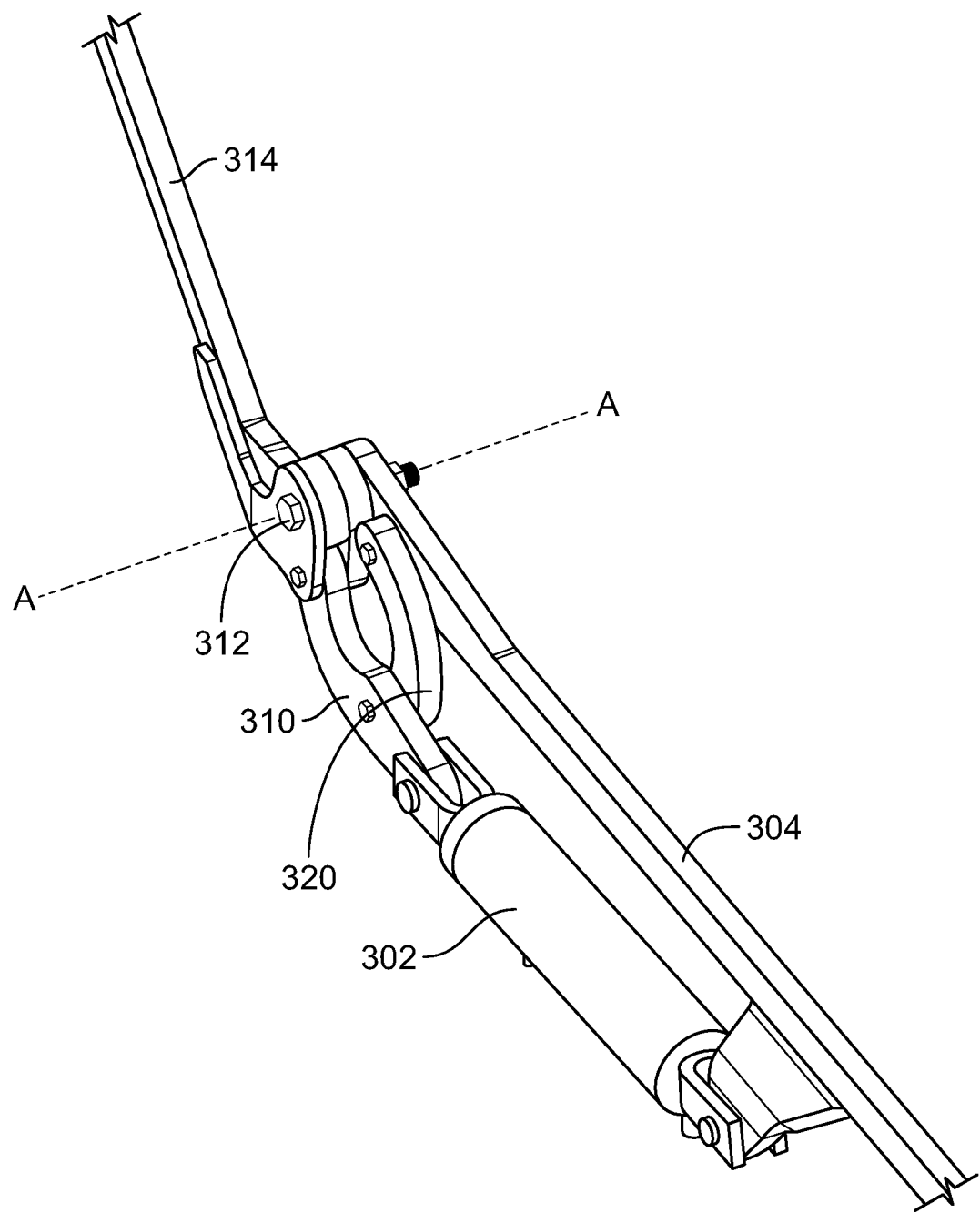

While the embodiment shown in FIG. 6 provides one exemplary mechanism to cause rotation in response to actuation of power hydraulic cylinders, those skilled in the art will clearly recognize that other mechanisms could equally be utilized. As an example, FIGS. 7A-7C illustrates an alternative embodiment of a power foldover linkage 300. In this embodiment, power foldover linkage 300 is again driven by a hydraulic cylinder 302. For simplicity, hydraulic supply lines, utilized to control hydraulic cylinder 302 are not illustrated in FIGS. 7A-7C. As shown, a primary support 304 is coupled to one end of hydraulic cylinder 302 utilizing a coupling tab 306 which extends downwardly from primary support 304. It is contemplated that primary support 304 will be affixed to one side of a chute segment. A secondary support 308 will be permanently coupled to an opposite side of chute segment, in order to further facilitate overall operation. A second end of cylinder 302 is coupled to a first link element 310, which is configured to receive forces by hydraulic cylinder 302 and facilitate folding operations as discussed above. A portion of first link element 310 is also coupled to a primary downstream support 314 at one end thereof.

As more specifically illustrated in FIG. 7A, a secondary downstream support 318 is also utilized as part of power foldover chute 180. In this particular embodiment, a primary downstream support 314 and secondary downstream support 318 will be permanently coupled to a subsequent one of the chute elements. Secondary downstream support 318 will also have a coupling tab 316 which will be used as part of a subsequent power foldover linkage 300' (not shown). As is also illustrated, primary support 304 and primary downstream support 314 are rotatably coupled to one another at a rotation point. Similarly, secondary support 308, and secondary downstream support 318 are also rotatably coupled to one another at a rotation point. The rotation points of these complimentary components are axially aligned so that related components can rotate in conjunction with one another about a single axis of rotation (A-A).

As better shown in FIGS. 7B and 7C, a second link element 320 is also incorporated into power foldover linkage 300. Second link element 320 is also rotatably coupled to primary support 304 and first link element 310. As will be recognized, these linkage elements cooperating with one another will cause rotational movement of primary downstream element 314 in relation to primary support 304, when hydraulic cylinder 302 is actuated. This rotation occurs about a coupling point 312 which is axially aligned with the axis of rotation (A-A) mentioned above.

Figure 8:
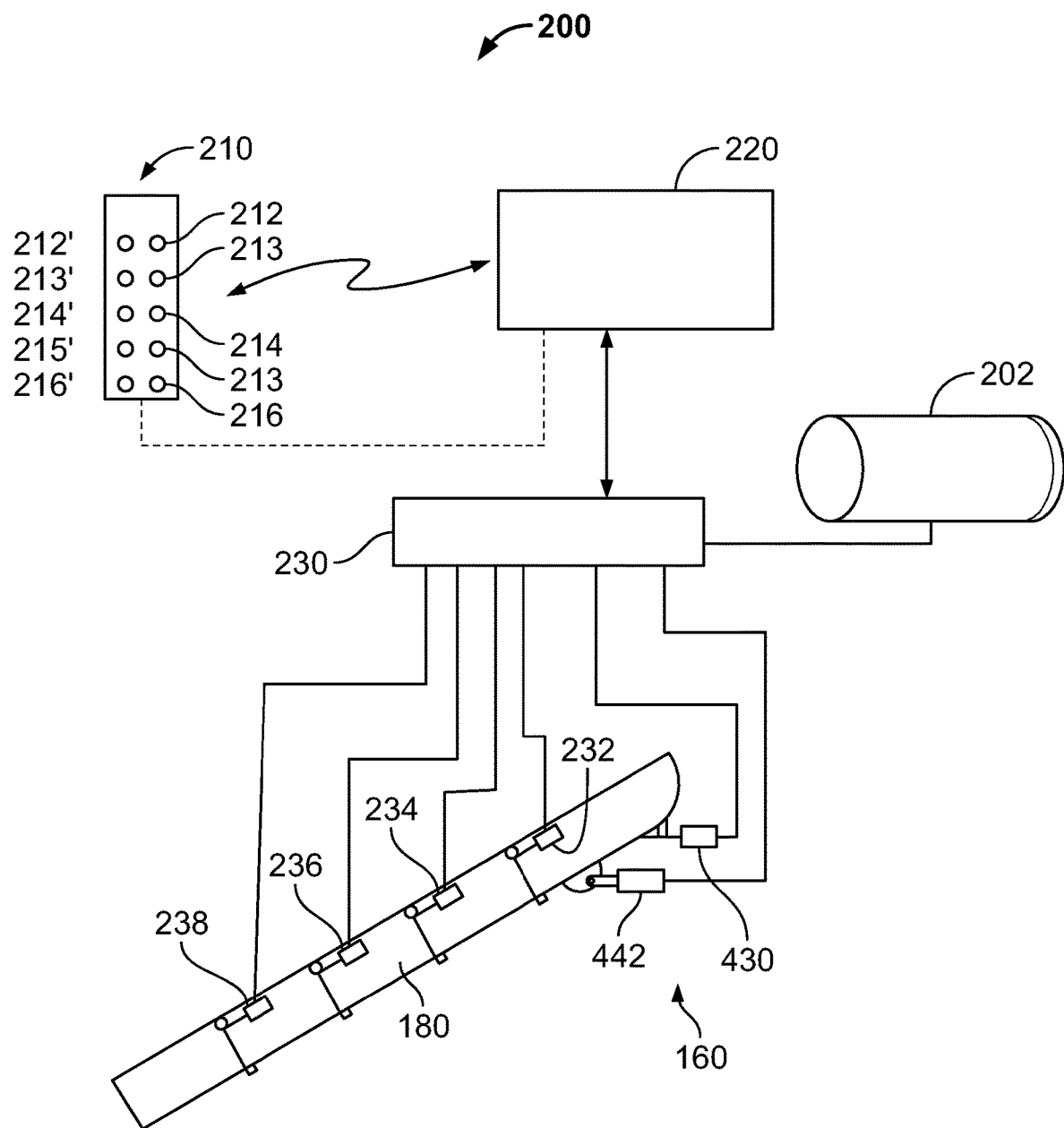
FIG. 8 provides a schematic illustration of the mechanisms used to control the power fold and swing discharge system.

As suggested above, the folding and unfolding operations of power foldover discharge chute 80, 180 is carefully coordinated to provide efficiency, simplicity and avoid any potential conflicts. Referring now to FIG. 8, a schematic illustration of the control system 200 is generally shown. In this embodiment, it is contemplated that all operations of the repositionable power delivery system 160 are generally controlled by a system controller 220. An operator will be able to direct these operations using a remote control device 210, which has a number of control buttons 212-216 thereon. It is also contemplated that remote control device 210 could be a wireless remote, or could be wired directly to a system controller 220. Additionally, or alternatively, additional controls could be located within the cab, making them easily accessible to a driver/operator. Controller 220 will contain a programmable control component, which could be a microprocessor, a microcontroller, a programmable logic device, or specialized electronic component, along with all connections and communication components needed to carry out operations. It is also contemplated that controller 220 may control other operations of the concrete mixer truck, such as drum rotation, water/wash systems, and other delivery operations.

Controller 220 is directly coupled to a hydraulic control block 230 which is used to control the flow of hydraulic fluid to various components within the system. In this embodiment, a hydraulic reservoir 202 is utilized to supply hydraulic fluid at desired pressures. As will be appreciated, hydraulic control block 230 will include actuators and various control valves to direct fluid in a desired manner. The operation of these valves is orchestrated and monitored by controller 220 to ensure operation in a desired manner. In addition to actuators and valves, hydraulic control block 230 may also include one or more pressure sensors (not shown) which are capable of providing feedback as necessary.

Hydraulic control block 230 has a number of outputs which feed multiple hydraulic cylinders. This includes a first fold cylinder 232, a second fold cylinder 234, a third fold cylinder 236 and a fourth fold cylinder 238. As generally illustrated, each of these cylinders are coupled to a particular folding mechanism/linkage of power foldover discharge chute 80, 180. Further, each of these cylinders will provide the necessary force to fold or unfold related segments of power foldover discharge chute 80, 180. In this embodiment, it is contemplated that each cylinder will operate in a similar manner, however, the overall sequencing and control must be carried out in a particular manner which recognizes the circumstances and environment in which a particular cylinder is used.

As will be recognized, the pressure levels encountered during operation of a hydraulic cylinder can be easily profiled. More specifically, pressure at a certain level will indicate the cylinder is static. A second pressure level will cause movement of the cylinder. Lastly, a third pressure level will indicate that the system is attempting to drive the cylinder, but the cylinder has reached a stop or the end of its intended travel. This knowledge allows controller 220 to coordinate operation of power delivery system 160 in a manner to insure desired sequencing is followed, and damage is avoided. Due to the nesting capabilities outlined above, this controlled/coordinated movement of various segments is clearly required.

The folding and unfolding operations of power foldover discharge chute 80, 180 are generally discussed above. Using the unfolding operations of power foldover discharge chute 180 as an example, the overall unfolding process will begin by operating first fold cylinder 232 causing first foldable segment 184 to be extended. Again, hydraulic control block 220 may contain one or more pressure sensors which are capable of sensing hydraulic pressure at predetermined locations. Here, control block 230 is configured so that each fold cylinder will have a related pressure sensor which is used to provide necessary feedback. More specifically, first fold cylinder 232 will have a pressure sensor capable of indicating the pressure of fluid being provided. With this in mind, first fold cylinder 232 will be operated until the pressure provided to cylinder exceeds a threshold value (i.e. reaches the third pressure level mentioned above). This threshold value is predetermined based upon the cylinder configuration, and provides an indication that the cylinder is either completely extended or completely withdrawn (i.e. it has hit a stop on the extreme ends). Further, these pressures will indicate that the related foldable segment has either been completely extended or completely folded. Knowing that this feedback is available, controller 220 will not actuate subsequent cylinders until full extension or full retraction of a related segment is confirmed. Similar operations are carried out to control operation of second unfolding cylinder 234, third unfolding cylinder 236 and fourth unfolding cylinder 238 in a sequential manner until all segments have been extended.

Naturally, the process outlined above is simply reversed during the folding process. In this manner, folding operations will be coordinated so that related segments are appropriately positioned before a second or third folding operation is commenced.

Figure 11:
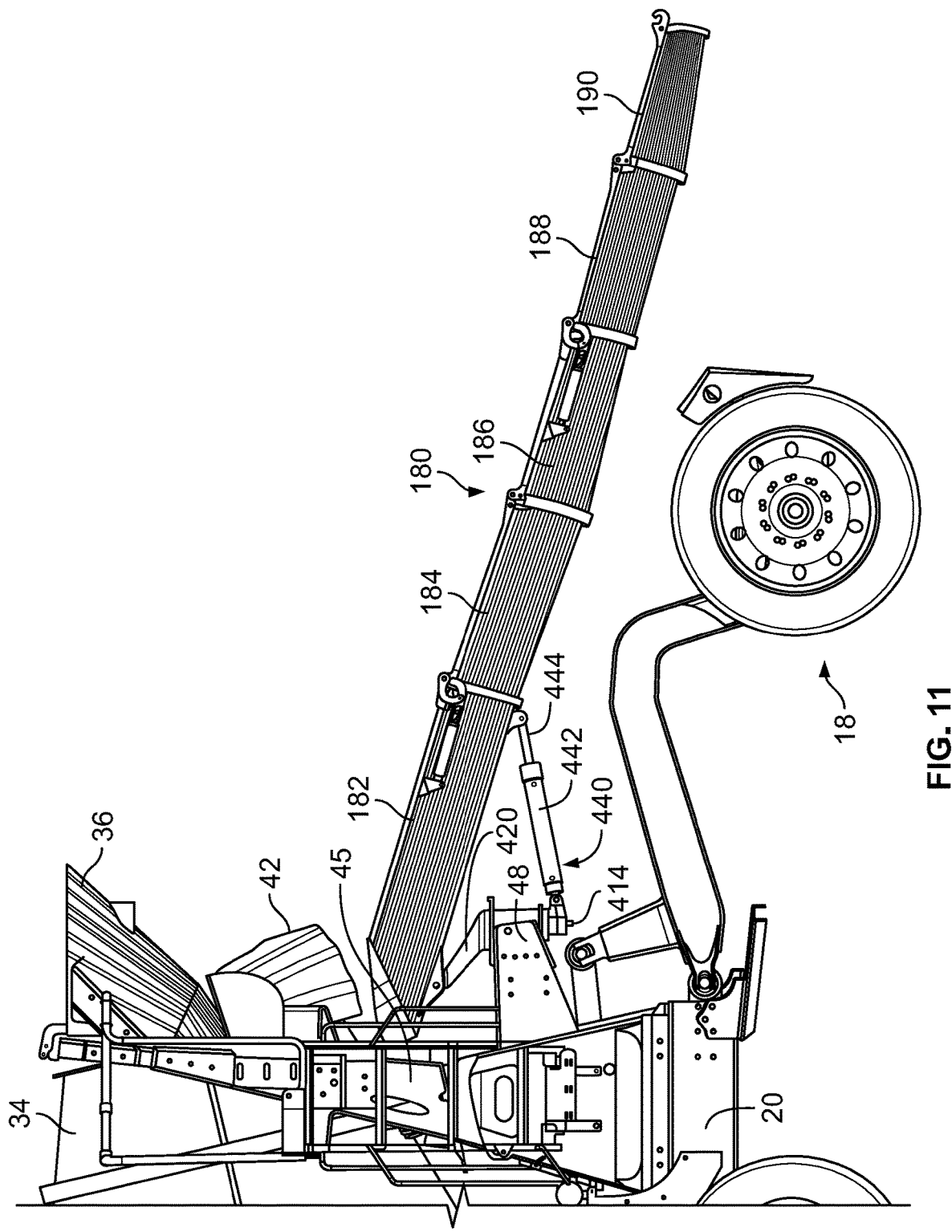
FIG. 11 is a side view showing one embodiment of the entire repositionable power delivery system as installed at the rear of a truck.

As mentioned above, remote control 210 is utilized to provide overall control to the a respositionable power delivery system 160. In the present embodiment, remote control 210 will have five sets of control buttons 212-216 and 212'-216'. Here, a first button set 212, 212' will be used to control operation of the drum 34 (i.e. drum rotation), and a second set 213, 213' will be used to control positioning of charge hopper 36. In this embodiment three sets of buttons are devoted to operation of power delivery system 160. An up/down set of buttons 214, 214' will be used to cause power discharge chute 80, 180 to have its outer end move upwardly or downwardly. This will be achieved by use of a lift cylinder 442, as generally discussed above and further discussed in relation to FIG. 11 below. Additionally, a swing set of buttons 215, 215' are included, which will cause the end power discharge chute 80, 180 to swing left or right (further details about the related power swing mechanism 400, including a swing cylinder 430, are set forth below). Lastly, a set of fold/unfold buttons 216, 216' are used to carry out the folding and unfolding operations discussed above. The up/down buttons 214, 214', the swing buttons 215, 215' and the fold/unfold buttons 216, 216' are all configured as "press and hold" buttons, thus requiring an operator to hold the specific button to cause the desired action to be carried out. In this manner, the operation can also be stopped by the operator simply releasing the related button.

Again, the folding and unfolding operations of power discharge chute 80, 180 are carried out in a very controlled and sequenced manner. Since control system 200 has been carefully configured to coordinate steps and sequences, the overall operations can be carried out by the user operating a single button. For example, the operator could simply press and hold unfold button 216, and the entire unfolding operation could be carried out. Similarly, the fold button 216' could be pressed and held, and the entire folding operation would be carried out. It is also noted that by releasing one of these buttons 216, 216', the operation could be stopped in the middle of its overall cycle. In this manner, the partially deployed orientation illustrated in FIG. 5 could be achieved.

Figure 9A:
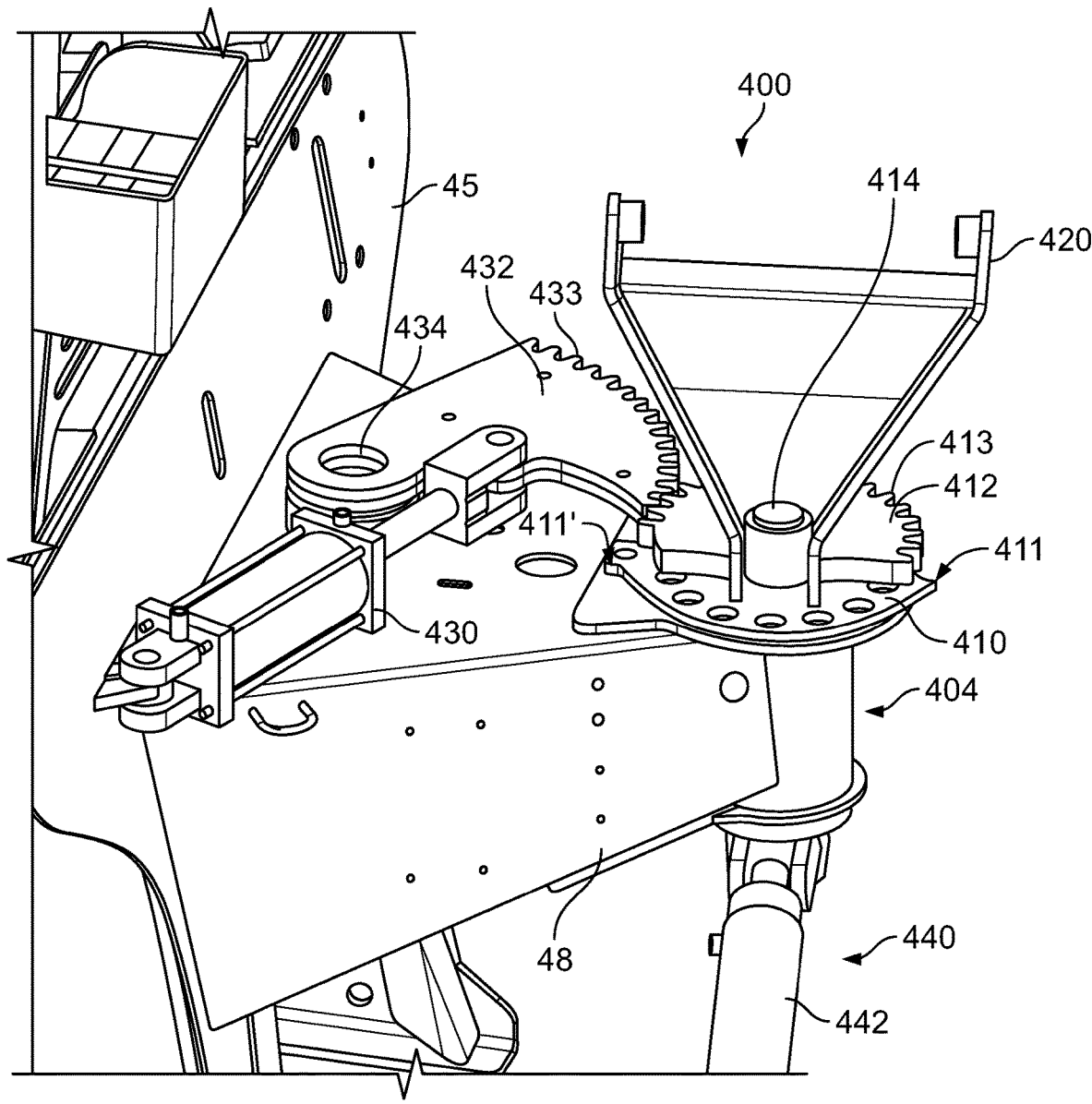
FIGS. 9A-9B are perspective close up views of the power swing mechanism utilized to rotate the chute about a substantially vertical axis.
Figure 9B:
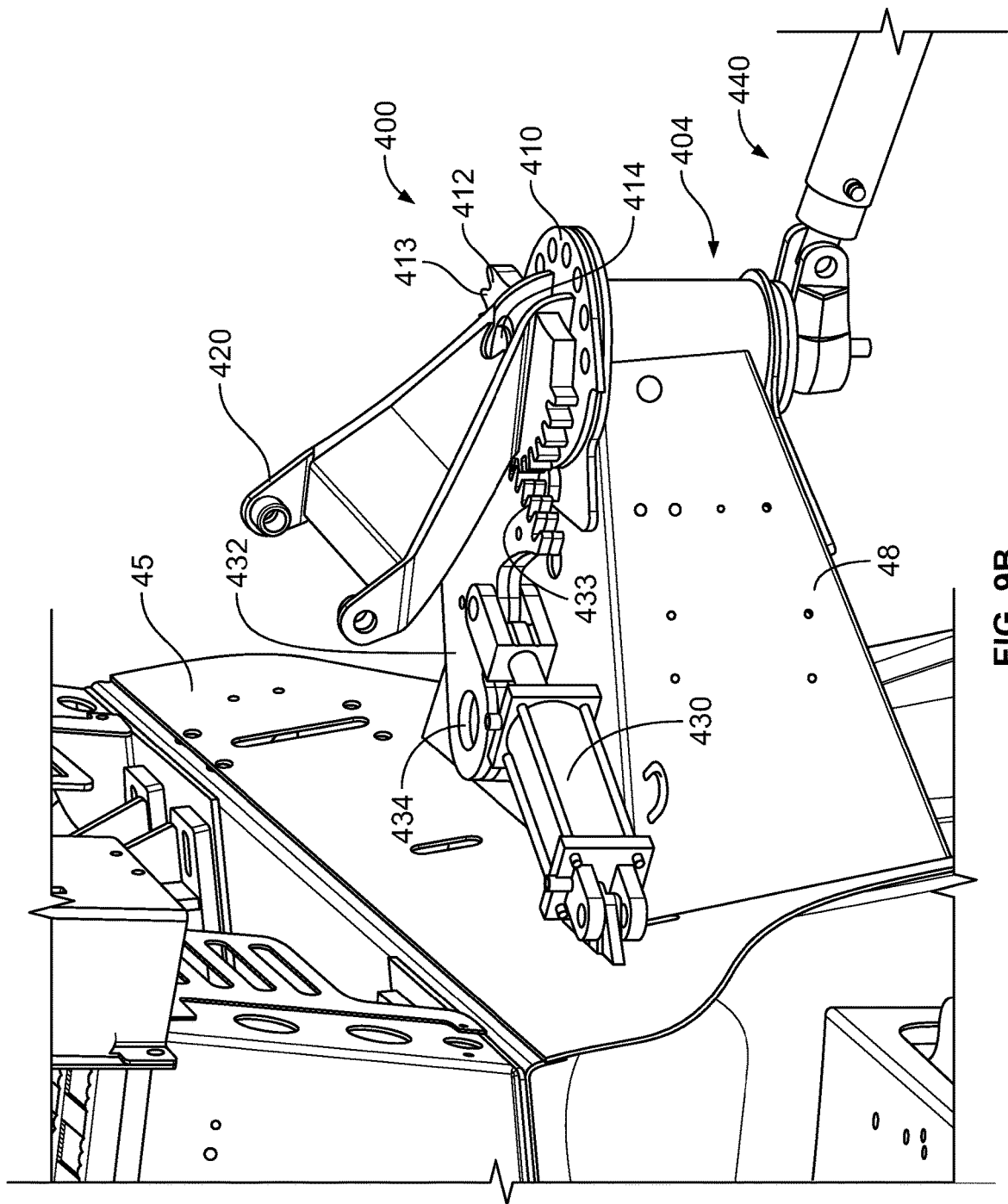

In addition to the folding or unfolding capabilities outlined above, it is beneficial to provide a lateral swing for the discharge chute. More specifically, this will allow for lateral movement of the discharge chute around the back end of concrete mixer truck 16. Turning now to FIGS. 9A-9B, a power swing mechanism 400 is shown. Here, a power mechanism will cooperate with a framework extension 48 which extends from the rear pedestal 45 of the concrete mixer truck 16. In this embodiment, framework extension 48 supports a pivot joint 404. Notably coupled to pivot joint 404 is a pivot plate 410 which supports various other components. More specifically, a rotating gear 412 is coupled pivot plate 410, along with a chute supporting mechanism 420. As will be appreciated, the upper ends of chute supporting mechanism 420 will be coupled to the primary chute segment, which is carried below the discharge chute. Pivot plate 410 is rotatably coupled to framework extension 48 via pin 414. In operation, pivot plate 410, rotating gear 412, and chute support 420 are connected and will rotate together. Additionally, pivot plate 410 includes a pair of stops 411, 411' which limit the distance of travel.

To provide powered movement, a hydraulic cylinder 430 is utilized to drive a coupling gear mechanism 432. Gear mechanism 432 is rotatably coupled to framework 48 via a rotation pin 434 and has teeth 433 engaged with cooperating teeth 413 on rotating gear 412. Actuation of cylinder 430 will cause gear 432 to rotate about pin 434. Thus, rotation of gear 432 will also translate into rotation of rotating gear 412 and all related components. In this manner, power discharge chute 80, 180 can be rotated or swung, as desired about pin 414. To provide further context, FIG. 9B shows the same components, with gear 432 and rotating gear 412 moved to different positions.

Figure 10:
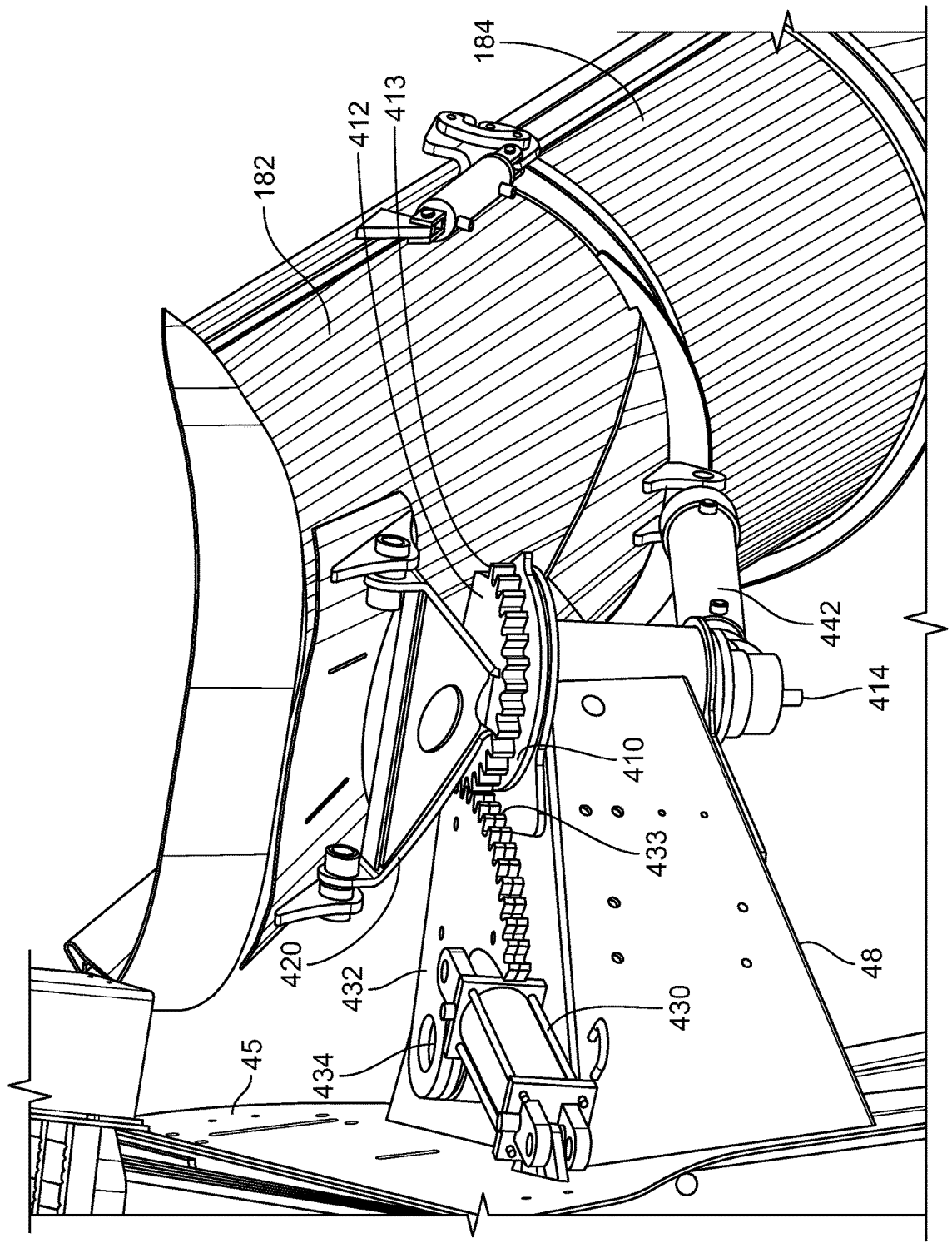
FIG. 10 is another view of the power swing mechanism, showing a chute segment attached.

To provide even further context for the power swing mechanism 400, FIG. 10 provides a similar illustration with a power discharge chute 180 attached to chute support 420. As illustrated here, and further illustrated in FIG. 11, an additional lift system 440 is provided to allow foldover chute 180 to be raised and lowered. Lift system 440 has a cylinder 442 has one end connected to a lower portion of pin 414, and thus will rotate with the related components. An opposite end of cylinder 442 (i.e. drive shaft end 444) is connected to an end portion of primary chute segment 182. As will be clear, extension and retraction of shaft end 444 will cause the end of the primary segment 182 to move upwardly and downwardly. While the connections are not specifically illustrated, it is understood that hydraulic cylinder 442 and rotation cylinder 430 are both controlled and operated by control system 200 discussed above. Again, these mechanisms are controlled by the operator utilizing remote control device 210 or similar control mechanisms.

The embodiments above illustrate a power swing and fold chute used on a rear discharge truck. It will be appreciated that the same or similar mechanism could equally be used on front discharge concrete mixer trucks with certain modifications. The mounting and use on a front discharge concrete mixer truck would include all of the advantages outlined above, including the ability to easily position the delivery chute without requiring an operator to physically handle or manipulate chute segments.

Each of the above-mentioned components provide certain mechanisms to control movement and placement of a discharge chute. As also suggested above, these components are controlled and operated by actuators contained within a remote control device, or within the cab of truck 16. In addition, additional safety mechanisms could be added to provide further safeguards and protect anyone within the area behind the truck. As one example, a video camera 150 could be coupled to an upper portion of the charge hopper 36. This would provide a broad view of the back of truck 16, and allow an operator in the cab to see what is happening while operating the truck and various components. In addition, a number of proximity sensors could be positioned at desired locations to detect the presence of obstructions and/or individuals. In one example, these proximity sensors can be coupled to various portions of the discharge chute, and cooperate with control system 200. In this manner, the sensors can detect the presence of such obstructions/individuals, while also allowing the chute to operate in its normal manner.

Further enhancements and safety could include warning beepers, and additional cameras as needed. All of these systems are coordinated by an overall control system contained within the cab, thus producing one overall efficient system capable of operating safely, efficiently and without human physical interaction.

Various embodiments of the invention have been described above for purposes of illustrating the details thereof and to enable one of ordinary skill in the art to make and use the invention. The details and features of the disclosed embodiment[s] are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The inventiona claimed is:

1. An automated and remotely positionable foldover chute assembly for the coordinated delivery of concrete from a concrete mixer truck, comprising:
   a primary chute segment coupled to the concrete mixer truck and positioned to receive concrete from a drum carried on the concrete mixer truck, said primary chute being rotatable about a mounting point at the rear of the concrete mixer truck;
   a plurality of foldable chute segments, comprising a first foldable chute segment rotatably coupled to the primary chute segment and a second foldable chute segment rotatably coupled to the first foldable chute segment, wherein the primary chute segment, the first foldable cute segment and the second foldable chute segment are positionable in an end-to-end orientation to create an elongated delivery chute, and wherein the primary chute segment, the first foldable chute segment and the second foldable chute segment are positionable in a folded orientation which causes the primary chute segment, the first foldable chute segment and second foldable chute segment to be aligned in substantially the same direction with the second foldable chute segment to be nested between the primary chute segment and the first foldable chute segment;
   a power fold mechanism operable to cause the rotation of the first foldable chute segment relative to the primary chute segment, and to cause rotation of the second foldable chute segment relative to the first foldable chute segment, thus allowing the automated positioning between the end-to-end orientation, and the folded orientation;
   a power swing mechanism coupled to the primary chute segment to cause rotatable positioning of the primary chute segment at a predetermined alignment away from the concrete mixer truck; and
   a controller coupled to the power fold mechanism and the power swing mechanism to control folding and positioning operations.

2. The foldover chute assembly of claim 1 wherein the power fold mechanism comprises a plurality of hydraulic cylinders and a plurality of foldover linkage members coupled between the plurality of chute segments, with the plurality of hydraulic cylinders being controlled by the controller in a manner to carry out a controlled folding operation and a controlled unfolding operation.

3. The foldover chute assembly of claim 2 further comprising a remote control in communication with the controller, usable by an operator to operate the power swing mechanism and the power fold mechanism.

4. The foldover chute assembly of claim 3 wherein the remote control has a plurality of controls thereon, wherein the controls comprise an unfold button to carry out the unfold operation and a fold button to carry out the fold operation.

5. The foldover chute assembly of claim 4 wherein the unfold operation will be carried out so long as the operator holds the unfold button, and wherein the fold operation will be carried out so long as the operator holds the fold button.

6. The foldover chute assembly of claim 4 wherein the remote control further comprises an up button, a down button, a left button and a right button.

7. The foldover chute assembly of claim 3 wherein the remote control is a wireless remote control.

8. The foldover chute assembly of claim 3 wherein the remote control is a hard wired remote control.

9. The foldover chute assembly of claim 1 wherein the plurality of chute segments further comprises a third foldable chute segment rotatably coupled to the second chute segment and a final chute segment rotatably coupled to the third chute segment, and wherein third chute segment and final chute segment are positionable in an end-to-end orientation with the primary chute segment, first chute segment and second chute segment to create an elongated delivery chute, and wherein the third chute segment and the final chute segment are positionable in a folded orientation along with the primary chute, first chute segment and second chute segment, which causes the primary chute segment, the first foldable chute segment, the second foldable chute segment, third foldable chute segment and final chute segment to be aligned in substantially the same direction with one another, and to be nested within one another.

10. The foldover chute assembly of claim 9 wherein the plurality of chute segments alternate between a straight chute segment and tapered chute segment.

11. The foldover chute assembly claim 10 wherein the primary chute segment, second chute segment and final chute segment are tapered, and, the first chute segment and the third chute segment are straight.

12. The foldover chute assembly of claim 11 wherein, when in the folded orientation, the final segment is nested within the second segment, and the second segment is nested in the primary segment.

13. The foldover chute assembly of claim 12 wherein, when in the folded orientation, the third segment is nested within the first segment.

14. The foldover chute assembly of claim 1 further comprising a camera mounted on the truck to provide a video image of the area adjacent the chute and provide such image to a display located within a cab of the concrete mixer truck.

15. The foldover chute assembly of claim 1 further comprising a third foldable segment rotatably coupled to the second foldable segment, wherein the third foldable segment extends from the second foldable segment while in the extended orientation, and wherein the third foldable segment nests between the first foldable segment and the second foldable segment when the safety chute assembly is in the folded orientation, and wherein the power fold mechanism is capable of causing the movement between the extended orientation and the folded orientation.

16. The foldover chute assembly of claim 1 wherein the power fold mechanism and the power swing mechanism comprise hydraulic cylinders.

17. A power repositionable chute system configured to be mounted on a rear portion of a concrete mixer truck for the delivery of concrete to a desired location, comprising:
a power foldover chute assembly comprising a plurality of chute segments rotatably coupled to one another in an end-to-end manner, and a plurality of power foldover linkage systems, with one of the plurality of power foldover linkage systems positioned between any adjacent chute segments of the plurality of chute segments; wherein the power foldover linkage system provides appropriate forces to cause rotation of the adjacent chute segments; and
a control system coupled to the plurality of foldover linkage systems to control a folding operation and an unfolding operation, wherein the folding operation causes the adjacent segments to rotate between an end-to-end orientation and a folded orientation, the control system comprising:
a remote control having a plurality of control buttons thereon operable by an operator to control predetermined operations including the folding operation and the unfolding operations;
a controller configured to receive signal from the remote control indicative of the operations desired by the operator; and
a sequencing block coupled to the controller so as to receive signals which will carry out the predetermined operations, the sequencing block further capable of providing necessary signals to the plurality of foldover linkage systems thereby causing the predetermined operations to be carried out;
wherein the unfolding operation causes the power foldover chute to transition from the folded orientation to the unfolded orientation in by following a plurality of unfolding steps in a sequential manner, and wherein the folding operation causes the power foldover chute to transition from the unfolded orientation to the folded orientation by following a plurality of folding steps in a sequential manner.

18. The power repositionable chute system of claim 17 further comprising a pressurized supply of hydraulic fluid coupled to the sequencing block, wherein the sequencing block further comprises a plurality of hydraulic valves and a plurality of sensors, with each of the plurality of hydraulic valves having an output coupled to a corresponding one of the foldover linkage systems, and each of the plurality of sensors is capable of detecting the pressure of hydraulic fluid supplied to the corresponding output, thereby providing an indication related to an operational status of the corresponding power foldover linkage.

19. The chute system of claim 18 wherein the sequential manner of the folding operation and the unfolding operations are controlled by operating a first power foldover linkage system of the plurality of linkage systems until a desired one of the folding or unfolding steps is completed before starting a desired second one of the folding or unfolding steps.

20. The chute system of claim 19 wherein the folding operation is carried out by a user pressing and holding a fold button on the remote control and where the unfolding operation is carried out by a user pressing and holding an unfold button on the remote control.

21. The chute system of claim 17 wherein the remote control is a wireless remote control.

22. The chute system of claim 17 wherein the remote control is a wired remote control.

23. The chute system of claim 17 wherein the plurality of chute segments comprise a primary chute segment, a final chute segment, and at least one intermediate chute segment, and wherein the final segment is nested between the primary segment and the at least one intermediate chute segment when in the folded orientation.

24. The chute system of claim 23 wherein the at least one intermediate chute segment comprises a first foldable segment, a second foldable segment and a third foldable segment.

25. The chute system of claim 23 wherein the primary segment has a first end coupled to the rear portion of the concrete mixer truck, the chute system further comprising
   a power lift mechanism coupled to the primary segment and the control system, wherein operation of the power lift mechanism will cause a second end of the primary segment to be raised and lowered, and
   a power swing mechanism coupled to the primary segment and the control system wherein operation of the power swing mechanism will cause the primary segment to rotate about a rotation axis situated at a predetermined location at the rear of the concrete mixer truck.

26. The chute system of claim 25 wherein operation of the power lift mechanism and the swing mechanism is controlled by the control system in response to signals received from the remote control.

27. A foldover discharge chute for use with a concrete mixer truck capable of being configured in an extended configuration which creates a continuous delivery surface for carrying concrete to a delivery location, and which is capable of being configured in a folded configuration where the foldover discharge chute is stowed for transportation, the foldover discharge chute comprising:
   a primary chute segment having mounting structures configured to allow attachment at a first end to a rear portion of the concrete mixer truck so as to receive concrete to be delivered;
   a first chute segment rotatably coupled at a first end to the primary chute segment to allow the first chute segment to rotate between an extended position and a folded position, wherein the extended position has the first end of the first chute segment situation adjacent a second end of the primary chute segment thus forming a portion of the continuous delivery surface and the folded position has the first chute segment stacked above the primary chute segment;
   a second chute segment rotatbly coupled at a second end to the first chute segment to allow the intermediate chute to rotate between an extended position and a folded position, wherein the extended position has the first end of the second chute segment situation adjacent the second end of the first primary chute segment thus forming a further portion of the continuous delivery surface, and the folded position has the second chute segment stacked adjacent first chute segment and nested between the primary chute segment and the first chute segment;
   a first power folding linkage coupled to the primary chute segment and the first chute segment to cause the automated movement of the first segment between the extended position and the folded position; and
   a second power folding linkage coupled to the first chute segment and the second chute segment to cause the automated movement of the first segment between the extended position and the folded position.

28. The foldover discharge of claim 27, wherein the primary chute segment and the second chute segment are configured in a tapered chute configuration and the first chute segment is configured in a straight chute configuration.

* * * * *